(12) United States Patent
Chang et al.

(10) Patent No.: US 10,379,650 B2
(45) Date of Patent: Aug. 13, 2019

(54) TOUCH-SENSING DISPLAY PANEL

(71) Applicant: Industrial Technology Research Institute, Hsinchu (TW)

(72) Inventors: Chih-Chia Chang, Hsinchu County (TW); Kuang-Jung Chen, Hsinchu County (TW); Yi-Chuan Lu, Kinmen County (TW); Kai-Ming Chang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 117 days.

(21) Appl. No.: 15/287,735

(22) Filed: Oct. 7, 2016

(65) Prior Publication Data
US 2017/0102806 A1 Apr. 13, 2017

Related U.S. Application Data

(60) Provisional application No. 62/238,683, filed on Oct. 7, 2015.

(30) Foreign Application Priority Data

Aug. 15, 2016 (TW) .............................. 105125918 A

(51) Int. Cl.
G06F 3/041 (2006.01)
(52) U.S. Cl.
CPC .. G06F 3/0412 (2013.01); *G06F 2203/04102* (2013.01); *G06F 2203/04103* (2013.01);
(Continued)
(58) Field of Classification Search
CPC . G06F 2203/04102; G06F 2203/04103; G06F 2203/04107; G06F 2203/04111; G06F 2203/04112; G06F 3/0412
See application file for complete search history.

(56) References Cited

U.S. PATENT DOCUMENTS 9,007,337 B2 4/2015 Chien et al.
9,501,165 B2 * 11/2016 Kim ...................... G06F 3/0412
(Continued)

FOREIGN PATENT DOCUMENTS

CN 101320309 12/2008
CN 102880325 1/2013
(Continued)

OTHER PUBLICATIONS

"Notice of allowance of Taiwan Counterpart Application", dated Apr. 14, 2017, p. 1-p. 4, in which the listed references were cited.
(Continued)

*Primary Examiner* — Michael J Jansen, II
(74) *Attorney, Agent, or Firm* — JCIPRNET

(57) ABSTRACT

In an embodiment of the disclosure, a touch-sensing display panel includes a substrate, connection electrodes, a touch-sensing device layer, a buffer layer, a display device, and conductive vias. The substrate has a display area and a non-display area connecting the display area. The connection electrodes are located on the non-display area of the substrate. The touch-sensing device layer is located on the substrate. The buffer layer covers the touch-sensing device layer. The display device including a first electrode layer, a second electrode layer, and a display medium layer is disposed on the buffer layer and corresponds to the display area. The first electrode layer and the second electrode layer extend from the display area to the non-display area. The conductive vias penetrate the buffer layer and correspond to the non-display area. The first electrode layer and the second electrode layer are electrically connected to the connection electrodes via the conductive vias.

18 Claims, 15 Drawing Sheets

(52) U.S. Cl.
CPC .............. *G06F 2203/04107* (2013.01); *G06F 2203/04111* (2013.01); *G06F 2203/04112* (2013.01)

(56) References Cited

U.S. PATENT DOCUMENTS

| | | | | |
|---|---|---|---|---|
| 9,513,733 | B2* | 12/2016 | Choi | G06F 3/0412 |
| 9,853,092 | B2* | 12/2017 | Lee | G06F 3/0412 |
| 9,952,737 | B2* | 4/2018 | Badaye | G06F 3/044 |
| 9,959,000 | B2* | 5/2018 | Kung | G06F 3/044 |
| 9,977,553 | B2* | 5/2018 | Son | G06F 3/044 |
| 2012/0227259 | A1* | 9/2012 | Badaye | G06F 3/044 |
| | | | | 29/846 |
| 2013/0147730 | A1 | 6/2013 | Chien et al. | |
| 2014/0152912 | A1* | 6/2014 | Lee | G06F 3/0412 |
| | | | | 349/12 |
| 2014/0160047 | A1* | 6/2014 | Choi | G06F 3/0412 |
| | | | | 345/173 |
| 2014/0210784 | A1* | 7/2014 | Gourevitch | H03K 17/962 |
| | | | | 345/174 |
| 2014/0320761 | A1* | 10/2014 | Misaki | G06F 3/044 |
| | | | | 349/12 |
| 2015/0185942 | A1* | 7/2015 | Kim | G06F 3/0412 |
| | | | | 345/173 |
| 2016/0342243 | A1* | 11/2016 | Kung | G06F 3/044 |
| 2017/0017318 | A1* | 1/2017 | Son | G06F 3/044 |
| 2017/0102806 | A1* | 4/2017 | Chang | G06F 3/0412 |

FOREIGN PATENT DOCUMENTS

| | | |
|---|---|---|
| CN | 104238806 | 12/2014 |
| CN | 104318885 | 1/2015 |
| CN | 104752484 | 7/2015 |
| TW | I401489 | 7/2013 |
| TW | M472244 | 2/2014 |
| TW | I442292 | 6/2014 |
| TW | M483484 | 8/2014 |
| TW | I463452 | 12/2014 |
| TW | M491209 | 12/2014 |
| TW | M502899 | 6/2015 |
| TW | M508720 | 9/2015 |

OTHER PUBLICATIONS

"Office Action of China Counterpart Application," dated Apr. 30, 2019, p. 1-p. 5.

* cited by examiner

TOUCH-SENSING DISPLAY PANEL

CROSS-REFERENCE TO RELATED APPLICATION

This application claims the priority benefits of U.S. provisional application Ser. No. 62/238,683, filed on Oct. 7, 2015 and Taiwan application serial no. 105125918, filed on Aug. 15, 2016. The entirety of each of the above-mentioned patent applications is hereby incorporated by reference herein and made a part of this specification.

TECHNICAL FIELD

The disclosure relates to a touch-sensing display panel.

BACKGROUND

A touch-sensing display panel includes a display panel and a touch-sensing panel, and the touch-sensing panel may be built in the display panel or adhered to the display panel. Based on different sensing types, the touch-sensing panel may be generally categorized into a resistive touch-sensing panel, a capacitive touch-sensing panel, an optical touch-sensing panel, an acoustic-wave touch-sensing panel, and an electromagnetic touch-sensing panel. The capacitive touch-sensing panel may characterize by short response time, favorable reliability, satisfactory durability, and so on. Therefore, the capacitive touch-sensing panel can be extensively applied in electronic products.

In general, the layout of peripheral circuits of the touch-sensing panel and the peripheral circuits of the display panel should be arranged in consideration of correlations between locations of circuit boards and locations of devices in upper and lower substrates. The overall circuit layout of the touch-sensing display panel may occupy significant space in the panel, such that the design of the touch-sensing panel may be restricted in many ways.

SUMMARY

In an embodiment of the disclosure, a touch-sensing display panel includes a substrate, a plurality of connection electrodes, a touch-sensing device layer, a buffer layer, a display device, and a plurality of conductive vias. The substrate has a display area and a non-display area connecting the display area. The connection electrodes are located on the non-display area of the substrate. The touch-sensing device layer is located on the display area of the substrate. The buffer layer covers the touch-sensing device layer. The display device is disposed on the buffer layer and corresponding to the display area, the display device comprising a first electrode layer, a second electrode layer, and a display medium layer located between the first electrode layer and the second electrode layer. The first electrode layer and the second electrode layer extend from the display area to the non-display area. The conductive vias penetrate the buffer layer and correspond to the non-display area. Here, the first electrode layer and the second electrode layer are electrically connected to the connection electrodes through the conductive vias.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
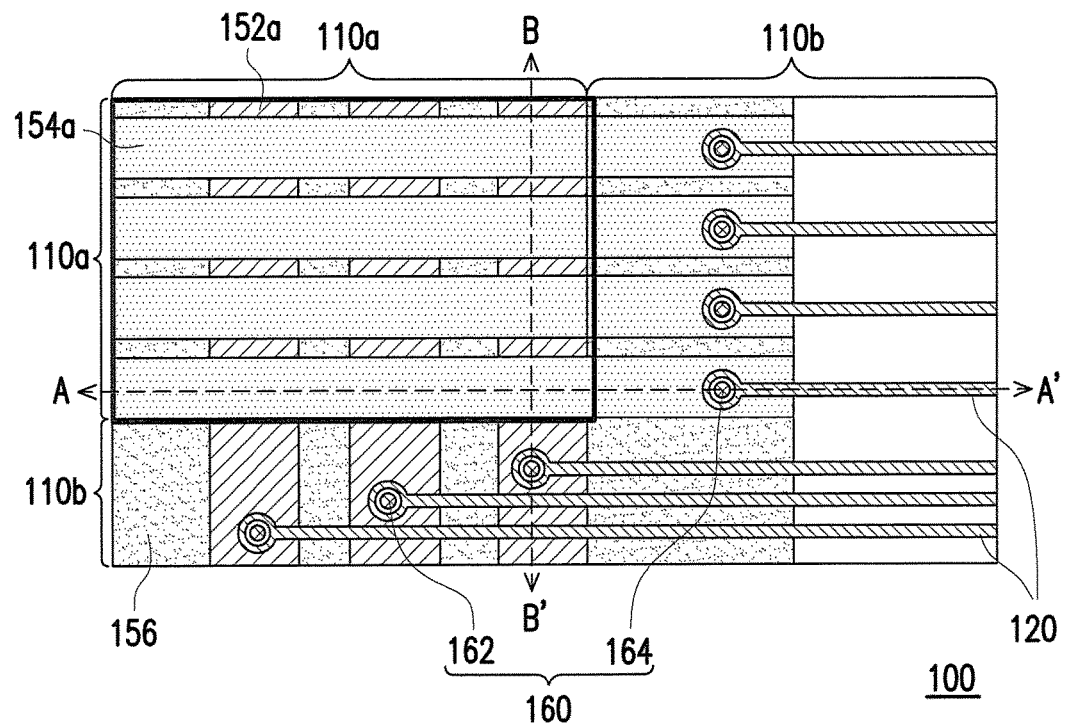
FIG. 1A is a schematic top view of a touch-sensing display panel according to a first embodiment of the disclosure.
Figure 1B:
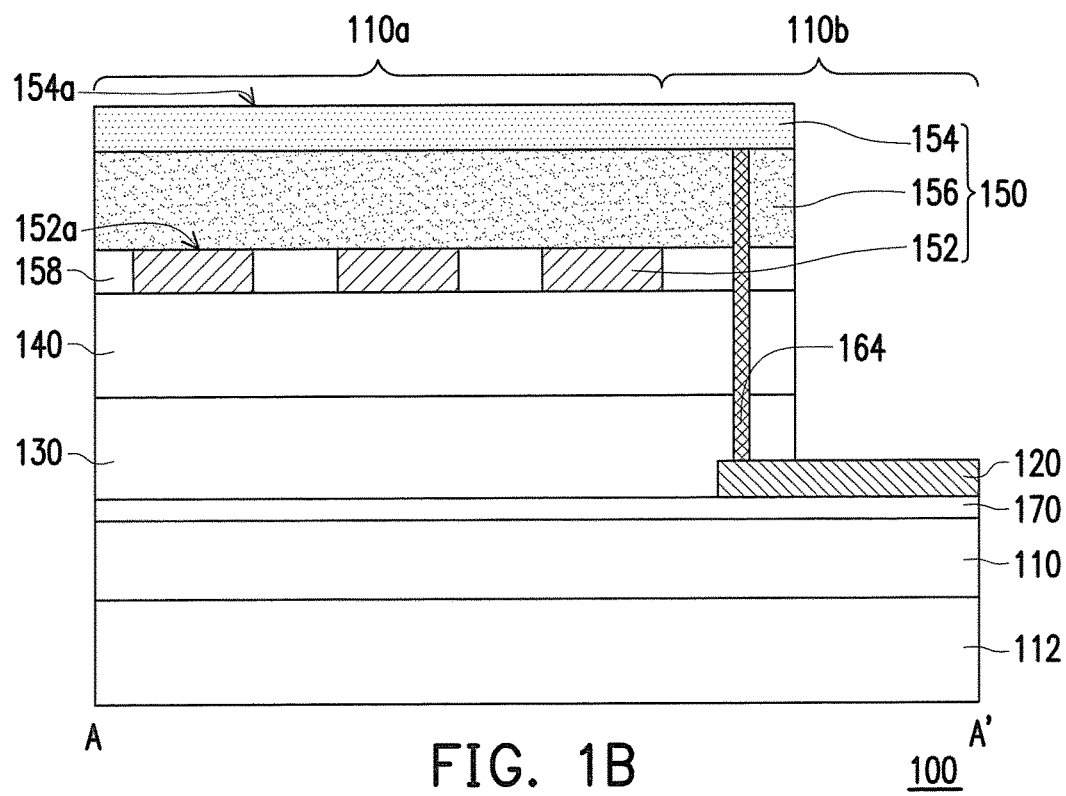
FIG. 1B and FIG. 1C are schematic cross-sectional views respectively taken along sectional lines A-A' and B-B' in FIG. 1.
Figure 1C:
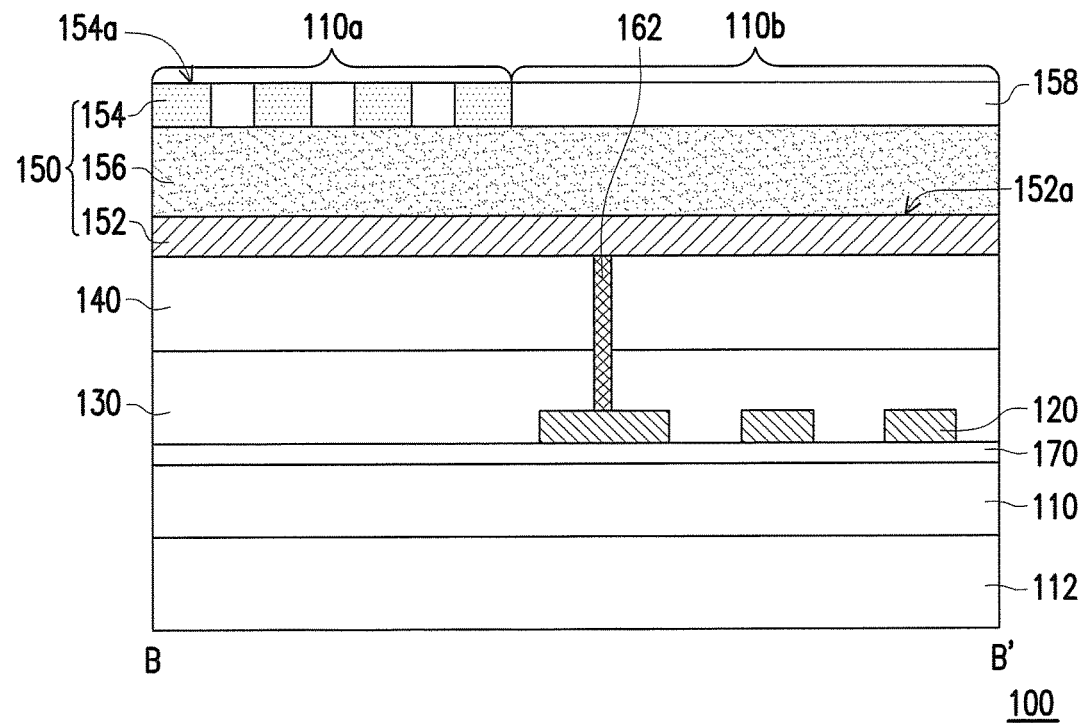

FIG. 1A is a schematic top view of a touch-sensing display panel according to a first embodiment of the disclosure, wherein some film layers are omitted in FIG. 1A. FIG. 1B and FIG. 1C are schematic cross-sectional views respectively taken along sectional lines A-A' and B-B' in FIG. 1. With reference to FIG. 1A, FIG. 1B, and FIG. 1C, in the present embodiment of the disclosure, a touch-sensing display panel 100 includes a substrate 110, a plurality of connection electrodes 120, a touch-sensing device layer 130, a buffer layer 140, a display device 150, and a plurality of conductive vias 160. The substrate 110 has a display area 110a and a non-display area 110b connecting the display area 110a. The connection electrodes 120 are located on the non-display area 110b of the substrate 110. The touch-sensing device layer 130 is located on the display area 110a of the substrate 110 and may extend to the non-display area 110b. The buffer layer 140 covers the touch-sensing device layer 130. The display device 150 is disposed on the buffer layer 140 and corresponds to the display area 110a. The display device 150 includes a first electrode layer 152, a second electrode layer 154, and a display medium layer 156 located between the first electrode layer 152 and the second electrode layer 154. The first electrode layer 152 and the second electrode layer 154 extend from the display area 110a to the non-display area 110b. The conductive vias 160 penetrate the buffer layer 140 and correspond to the non-display area 110b. Here, the first electrode layer 152 and the second electrode layer 154 are electrically connected to the corresponding connection electrodes 120 through the conductive vias 160.

In the present embodiment, the substrate 110 may be a rigid substrate or a flexible substrate that allows visible light to pass through, such that the light emitted from the display device 150 may penetrate the substrate 110. For instance, the rigid substrate may be made of glass or any other rigid material, and the flexible substrate may be made of polyimide (PI), polycarbonate (PC), polyamide (PA), polyethylene terephthalate (PET), polyethylene naphthalate, (PEN), polyethylenimine (PEI), polyurethane (PU), polydimethylsiloxane (PDMS), acrylate (e.g., polymethylmethacrylate (PMMA)), ether polymer (e.g., polyethersulfone (PES), polyetheretherketone (PEEK)), polyolefin, or any other flexible material. However, these materials should not be construed as limitations in the disclosure. The connection electrodes 120 may be made of metal, alloy, or other conductive materials, and one end of each connection electrode 120 is overlapped with the display device 150. In an embodiment of the disclosure, the width of the end of each connection electrode 120 overlapped with the display device 150 is greater than the width of the other end of each connection electrode 120 not overlapped with the display device 150, such that a landing pad may be formed at the ends of the connection electrodes 120 with the larger width, and that the landing pad is in contact with and electrically connected to the conductive vias 160. A shape of the landing pad is circular, elliptical, or polygonal, which should however not be construed as a limitation in the disclosure.

The touch-sensing device layer 130 is configured to detect a signal generated when a user touches the touch-sensing display panel 100, and the signal may indicate changes to capacitance, resistance, and so on. In an exemplary capacitive touch-sensing device layer 130, if the user touches the touch-sensing display panel 100, capacitance in the touched area of the touch-sensing display panel 100 may be changed, and such change may be detected and identified by a controller connected to the touch-sensing device layer 130.

The buffer layer 140 provided in the present embodiment may be a dielectric layer. For instance, the buffer layer 140 may be made of an inorganic material including SiOx, SiNx, SiON, AlOx, AlON, or the like. In other embodiments, the buffer layer 140 may be made of an organic material including PI, PC, PA, PET, PEN, PEI, PU, PDMS, acrylate (e.g., PMMA), ether polymer (e.g., PES, PEEK), polyolefin, the like, or a combination thereof. In other feasible embodiments, the organic material and the inorganic material may be alternately stacked to form the buffer layer 140. The buffer layer 140 is formed between the touch-sensing device layer 130 and the display device 150 and may be configured to separate the touch-sensing device layer 130 from the display device 150.

For instance, the buffer layer 140 has a planar upper surface, and the display device 150 may be subsequently formed on the planar upper surface. In addition, the buffer layer 140 is able to prevent oxygen and/or moisture penetration. If the touch-sensing display panel 100 is a flexible touch-sensing display panel, not only the issue of manufacturing the touch-sensing display panel with use of the flexible substrate has to be resolved, but also the difficulty in packaging the display device 150 should be overcome. For instance, in a rigid touch-sensing display panel, the rigid substrate as described above may be applied to prevent air penetration and protect the display device 150 from moisture and oxygen in the air. However, the flexible substrate made of the aforesaid flexible materials may not have sufficient barrier capability to satisfy the requirement for protecting the display device 150 from the air during the packaging process. At this time, the buffer layer 140 capable of providing the barrier effect can be applied to prevent air from penetrating the flexible substrate and thus protect the display device 150. What is more, the buffer layer 140 formed between the touch-sensing device layer 130 and the display device 150 can reduce crosstalk between the display signal and the sensing signal, and thus the display and touch-sensing quality of the touch-sensing display panel 100 provided herein can be improved.

The first electrode layer 152 of the display device 150 includes a plurality of first display electrodes 152a, and the second electrode layer 154 includes a plurality of second display electrodes 154a. Specifically, the first display electrodes 152a, the display medium layer 156, and the second display electrodes 154a are stacked onto the buffer layer 140, and the first display electrodes 152a and the second display electrodes 154a extend to the non-display area 110b from the display area 110a. A filler area 158 may be located between adjacent first display electrodes 152a and may be made of an insulation material, such that the adjacent first display electrodes 152a are electrically insulated from each other. The filler area 158 may also be located between adjacent second display electrodes 154a and may be made of an insulation material, such that the adjacent second display electrodes 154a are electrically insulated from each other. The first display electrodes 152a and the second display electrodes 154a may be made of transparent conductive materials or non-transparent conductive materials. The transparent conductive materials may be indium tin oxide (ITO), indium zinc oxide (IZO), and so on, for instance; the non-transparent conductive materials may be metal, for instance. The display medium layer 156 is made of an organic electroluminescent material, for instance.

The conductive vias 162 include a plurality of first conductive vias 162 and a plurality of second conductive vias 164. The first conductive vias 162 are connected between the first display electrodes 152a and some of the connection electrodes 120, and the first conductive vias 162 penetrate the buffer layer 140 and the touch-sensing device layer 130. The second conductive vias 164 are connected between the second display electrodes 154a and the remaining connection electrodes 120, and the second conductive vias 164 penetrate the buffer layer 140, the touch-sensing device layer 130, and the display medium layer 156. In the present embodiment, through holes may be further formed in the buffer layer 140, the touch-sensing device layer 130, and the display medium layer 156 through etching, polish drilling, laser drilling, or other manufacturing processes. The through holes may then be filled with conductive materials, so as to form the conductive vias 160 in the buffer layer 140, the touch-sensing device layer 130, and the display medium layer 156. Each of the first display electrodes 152a is electrically connected to one of the connection electrodes 120 on the non-display area 110b through the corresponding first conductive via 162, and each of the second display electrodes 154a is electrically connected to another one of the connection electrodes 120 on the non-display area 110b through the corresponding second conductive via 164.

In an exemplary embodiment, the touch-sensing display panel 100 may further include a substrate protection structure 112 located on one side of the substrate 110 opposite to the touch-sensing device layer 130. Namely, the substrate protection structure 112 and the touch-sensing device layer 130 are located on two opposite sides of the substrate 110. In an embodiment of the disclosure, the substrate protection structure 112 is made of tempered glass, quartz glass, etc.; the rigidity of the substrate protection structure 112 is greater than 1H, for instance, so as to protect the substrate 110 from abrasion or impact. According to an embodiment of the disclosure, the touch-sensing display panel 100 may further include a barrier layer 170 that may be located between the second electrode layer 154 and the substrate 110, on an outer surface of the substrate 110, or on the second electrode layer 154. A water vapor permeation rate of the barrier layer 170 is less than or equal to 0.1 g/m2/day, for instance. Preferably, the water vapor permeation rate of the barrier layer 170 is less than 0.01 g/m2/day. In addition, a material of the barrier layer 170 may include an inorganic material, such as SiOx, SiNx, SiON, and AlOx. The material of the barrier layer 170 may also include a metallic material, e.g., molybdenum, titanium, aluminum, chromium, molybdenum/aluminum/molybdenum, titanium/aluminum/titanium, and so forth. In the present embodiment, the selection of the material of the barrier layer 170 is relevant to the location of the barrier layer 170, and people having ordinary skill in the pertinent art are able to select the appropriate material according to the location of the barrier layer 170, such that no abnormal short circuit issue occurs in the connection electrodes 120, the touch-sensing device layer 130, the display device 150, and/or the conductive vias 160. It should be mentioned that the location, the number, and the type of the barrier layer 170 are not limited herein. In the present embodiment, the barrier layer 170 is located between the substrate 110 and the touch-sensing device layer 130; however, it is likely for the barrier layer 170 to be located between the touch-sensing device layer 130 and the buffer layer 140, between the buffer layer 140 and the first electrode layer 152, between the first electrode layer 152 and the display medium layer 156, and/or between the display medium layer 156 and the second electrode layer.

Another embodiment is given below to elaborate the touch-display display panel. It should be mentioned that the reference numerals and a part of the contents in the previous embodiment are used in the following embodiments, in which identical reference numerals indicate identical or similar components, and repeated description of the same technical contents is omitted. Please refer to the description of the previous embodiment for the omitted contents, which will not be repeated hereinafter.

Figure 2A:
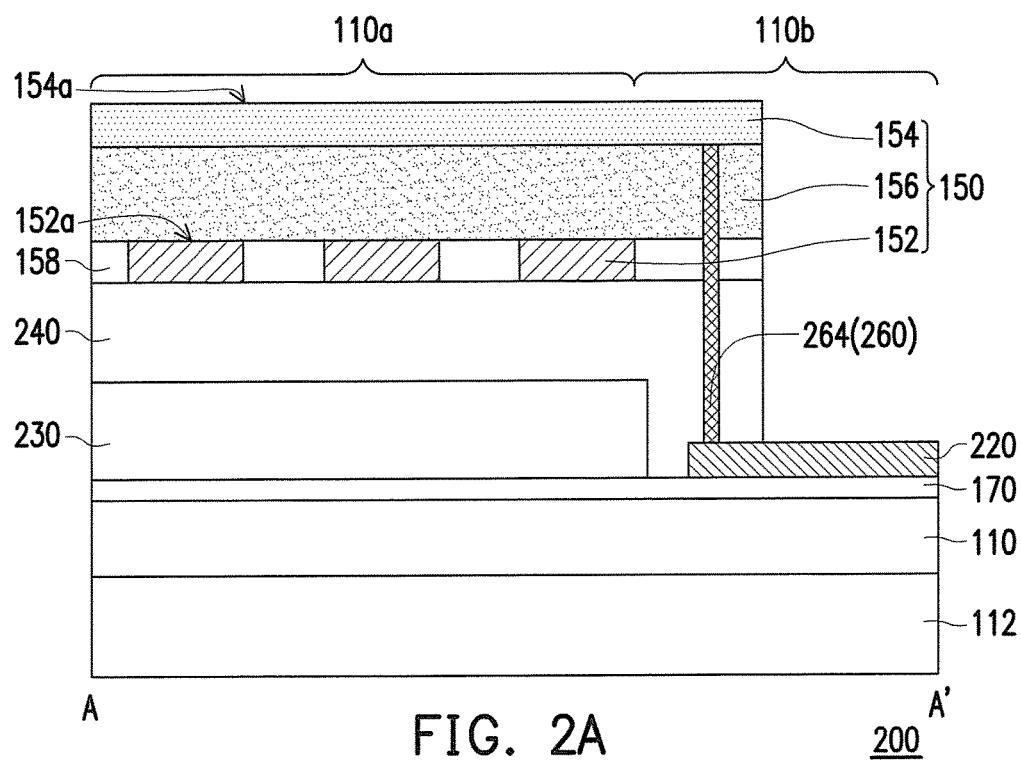
FIG. 2A and FIG. 2B are schematic cross-sectional views of a touch-sensing display panel according to a second embodiment of the disclosure.
Figure 2B:
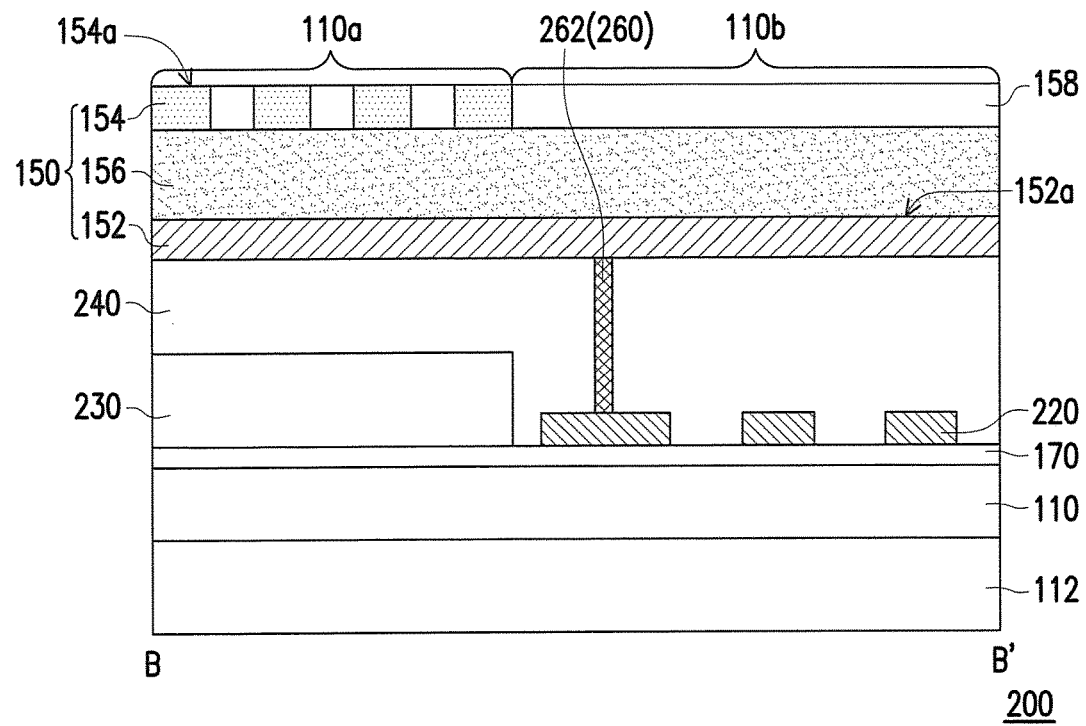

FIG. 2A and FIG. 2B are schematic cross-sectional views of a touch-sensing display panel according to a second embodiment of the disclosure. The touch-sensing display panel 200 provided in the second embodiment is similar to the touch-sensing display panel 100 provided in FIG. 1A. In the present embodiment, the descriptions of the touch-sensing display panel 200 are provided with reference to FIG. 1A, FIG. 2A, and FIG. 2B. It should be mentioned that the same or similar reference numbers in FIG. 1B, FIG. 1C, FIG. 2A, and FIG. 2B represent the same or similar components, and thus the components described above with reference to FIG. 1B and FIG. 1C will not be further explained hereinafter. In the present embodiment, the touch-sensing device layer 230 does not cover the connection electrodes 220, and the buffer layer 240 is located on the substrate 110 to cover the touch-sensing device layer 230 and some of the connection electrodes 220.

In this embodiment, as shown in FIG. 2A and FIG. 2B, the conductive vias 260 include a plurality of first conductive vias 262 and a plurality of second conductive vias 264. The first conductive vias 262 are connected between the first display electrodes 152a and some of the connection electrodes 220, and the first conductive vias 262 penetrate the buffer layer 240. The second conductive vias 264 are connected between the second display electrodes 154a and the remaining connection electrodes 220, and the second conductive vias 264 penetrate the buffer layer 240 and the display medium layer 156. In the present embodiment, through holes may be further formed in the buffer layer 240 and the display medium layer 156 through etching, polish drilling, laser drilling, or other manufacturing processes. The through holes may then be filled with conductive materials, so as to form the conductive vias 260 in the buffer layer 240 and the display medium layer 156. Each of the first display electrodes 152a is electrically connected to one of the connection electrodes 220 on the non-display area 110b (shown in FIG. 1A) through the corresponding first conductive via 262, and each of the second display electrodes 154a is electrically connected to another one of the connection electrodes 220 on the non-display area 110b (shown in FIG. 1A) through the corresponding second conductive via 264.

Figure 3A:
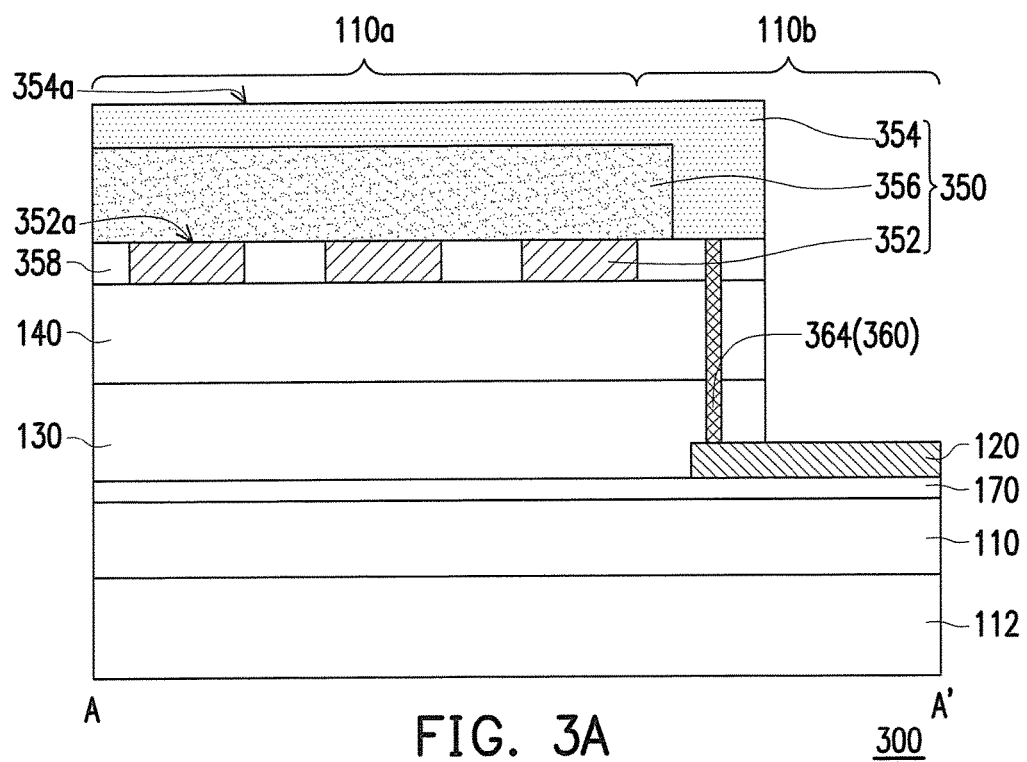
FIG. 3A and FIG. 3B are schematic cross-sectional views of a touch-sensing display panel according to a third embodiment of the disclosure.
Figure 3B:
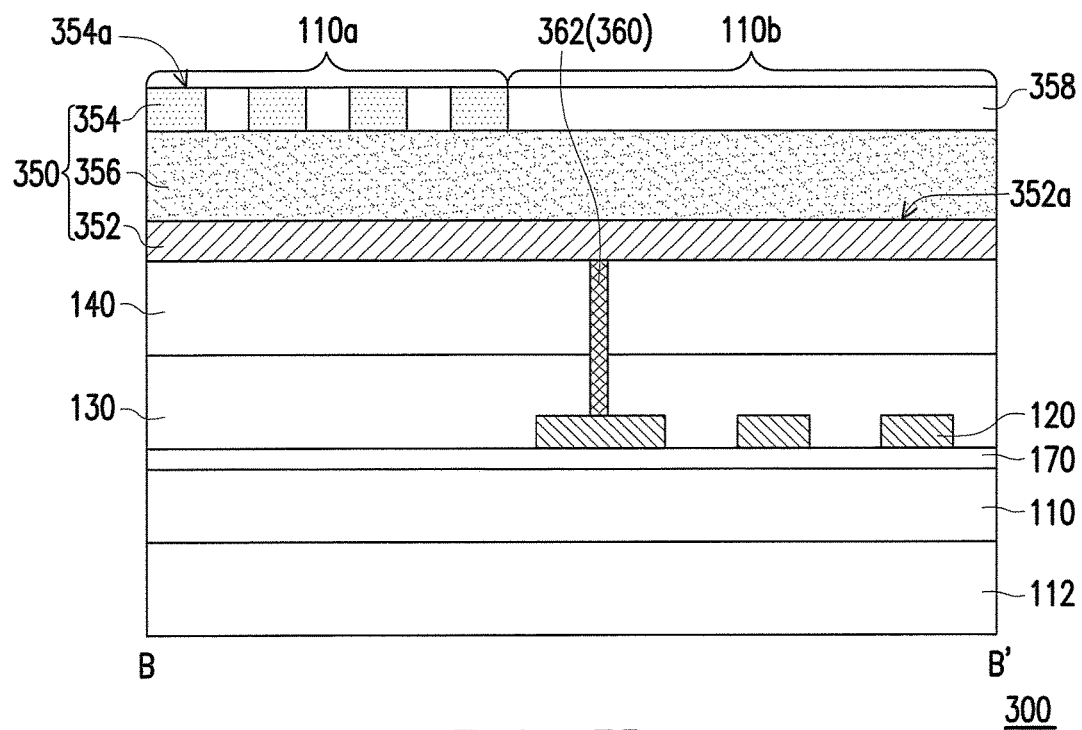

FIG. 3A and FIG. 3B are schematic cross-sectional views of a touch-sensing display panel according to a third embodiment of the disclosure. The touch-sensing display panel 300 provided in the third embodiment is similar to the touch-sensing display panel 100 provided in FIG. 1A. In the present embodiment, the descriptions of the touch-sensing display panel 300 are provided with reference to FIG. 1A, FIG. 3A, and FIG. 3B. It should be mentioned that the same or similar reference numbers in FIG. 1B, FIG. 1C, FIG. 3A, and FIG. 3B represent the same or similar components, and thus the components described above with reference to FIG. 1B and FIG. 1C will not be further explained hereinafter. According to the present embodiment, the second display electrodes 354a in the display device 350 cover the display medium layer 356 and a portion of the filler area 358.

In this embodiment, the conductive vias 360 include a plurality of first conductive vias 362 and a plurality of second conductive vias 364. The first conductive vias 362 are connected between the first display electrodes 352a and some of the connection electrodes 120, and the first conductive vias 362 penetrate the buffer layer 140 and the touch-sensing device layer 130. The second conductive vias 364 are connected between the second display electrodes 354a and the remaining connection electrodes 120, and the second conductive vias 364 penetrate the buffer layer 140, the touch-sensing device layer 130, and a portion of the display device 350 (e.g., the filler area 358 in the display device 350). In the present embodiment, through holes may be further formed in the buffer layer 140, the touch-sensing device layer 130, and a portion of the display device 350 through etching, polish drilling, laser drilling, or other manufacturing processes. The through holes may then be filled with conductive materials, so as to form the conductive vias 360 in the buffer layer 140, the touch-sensing device layer 130, and the portion of the display device 350. Each of the first display electrodes 352a is electrically connected to one of the connection electrodes 120 on the non-display area 110b (shown in FIG. 1A) through the corresponding first conductive via 362, and each of the second display electrodes 354a is electrically connected to another one of the connection electrodes 120 on the non-display area 110b (shown in FIG. 1A) through the corresponding second conductive via 364.

Figure 4A:
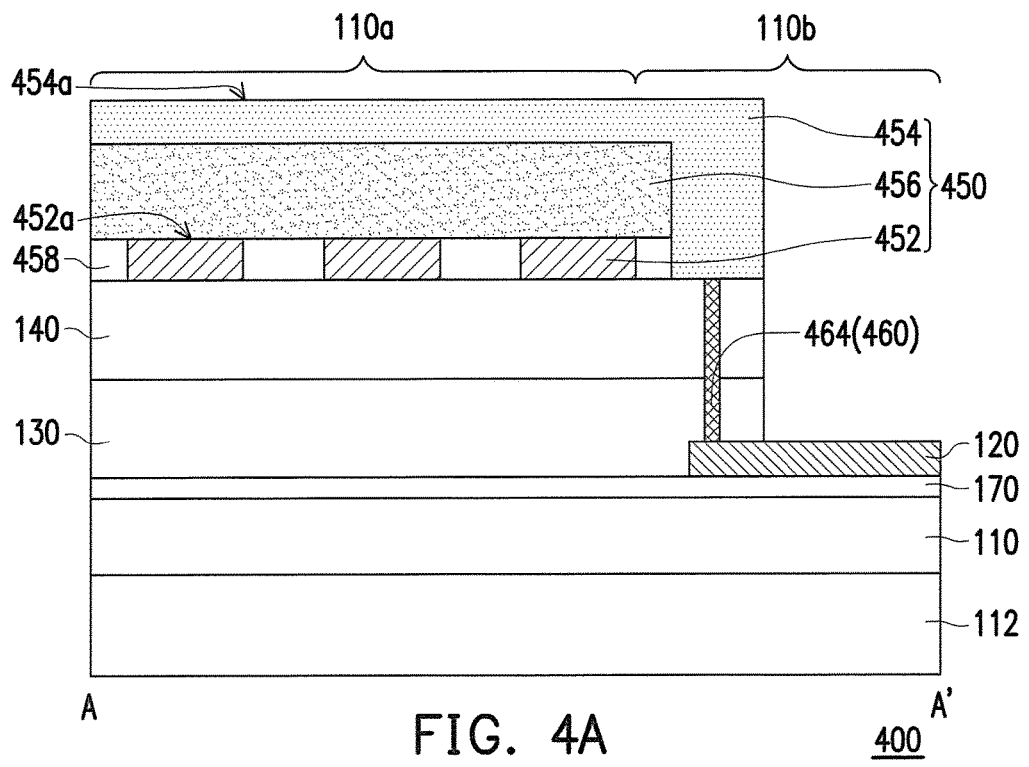
FIG. 4A and FIG. 4B are schematic cross-sectional views of a touch-sensing display panel according to a fourth embodiment of the disclosure.
Figure 4B:
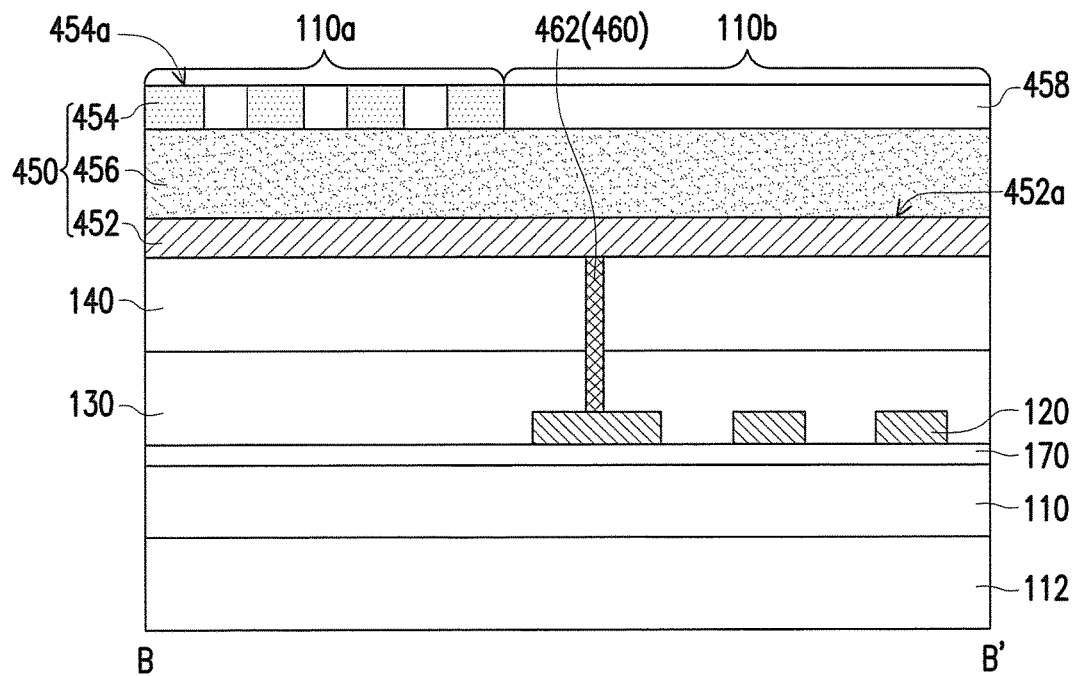

FIG. 4 is a schematic top view of a touch-sensing display panel according to a fourth embodiment of the disclosure. The touch-sensing display panel 400 provided in the fourth embodiment is similar to the touch-sensing display panel 100 provided in FIG. 1A. In the present embodiment, the descriptions of the touch-sensing display panel 400 are provided with reference to FIG. 1A, FIG. 4A, and FIG. 4B. It should be mentioned that the same or similar reference numbers in FIG. 1B, FIG. 1C, FIG. 4A, and FIG. 4B represent the same or similar components, and thus the components described above with reference to FIG. 1B and FIG. 1C will not be further explained hereinafter. According to the present embodiment, the second display electrodes 454a in the display device 450 cover the display medium layer 456, a portion of the filler area 458, and a portion of the buffer layer 140. The second display electrodes 454a extend from the display medium layer 456 to the buffer layer 140 and are in contact with a side wall of the filler area 458.

In this embodiment, the conductive vias 460 include a plurality of first conductive vias 462 and a plurality of second conductive vias 464. The first conductive vias 462 are connected between the first display electrodes 452a and some of the connection electrodes 120, and the first conductive vias 462 penetrate the buffer layer 140 and the touch-sensing device layer 130. The second conductive vias 464 are connected between the second display electrodes 454a and the remaining connection electrodes 120, and the second conductive vias 464 penetrate the buffer layer 140 and the touch-sensing device layer 130. In the present embodiment, through holes may be further formed in the buffer layer 140 and the touch-sensing device layer 130 through etching, polish drilling, laser drilling, or other manufacturing processes. The through holes may then be filled with conductive materials, so as to form the conductive vias 460 in the buffer layer 140 and the touch-sensing device layer 130. Each of the first display electrodes 452a is electrically connected to one of the connection electrodes 120 on the non-display area 110b (shown in FIG. 1A) through the corresponding first conductive via 462, and each of the second display electrodes 454a is electrically connected to another one of the connection electrodes 120 on the non-display area 110b (shown in FIG. 1A) through the corresponding second conductive via 464.

Figure 5:
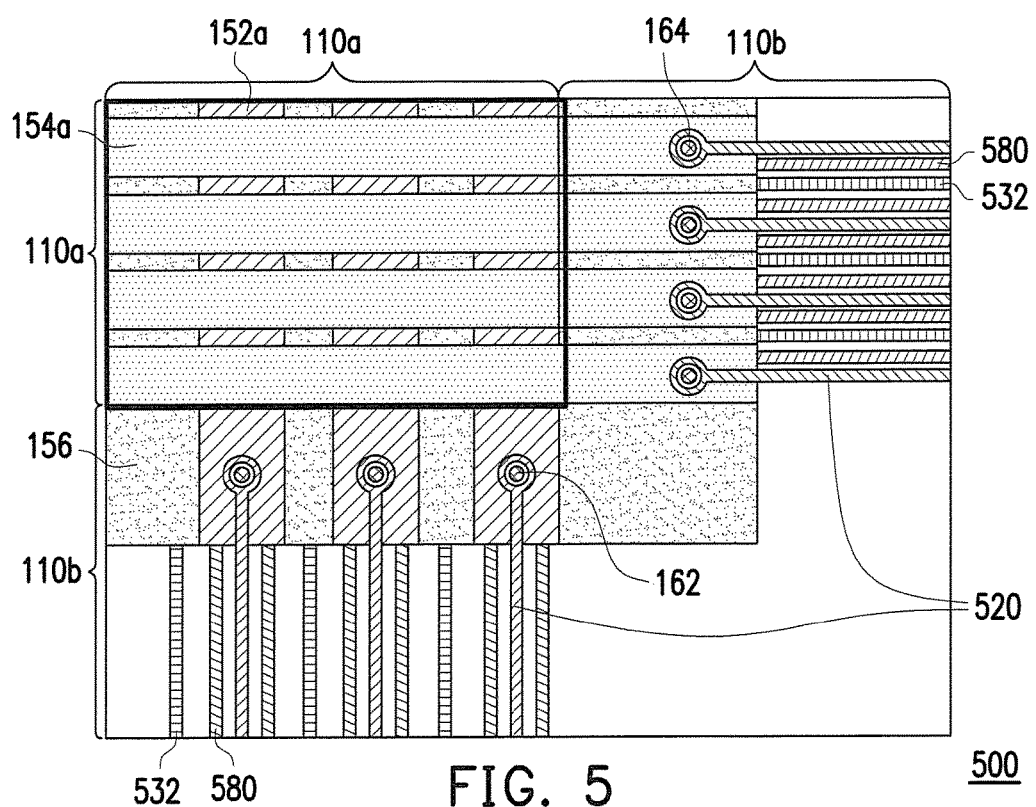
FIG. 5 is a schematic top view of a touch-sensing display panel according to a fifth embodiment of the disclosure.

FIG. 5 is a schematic top view of a touch-sensing display panel according to a fifth embodiment of the disclosure, wherein some film layers are omitted in FIG. 5 for illustrative purposes. The touch-sensing display panel 500 provided in this embodiment is similar to the touch-sensing display panel 100 depicted in FIG. 1. In the touch-sensing display panel 500, the touch-sensing device layer (not shown) includes a plurality of electrically insulated sensor electrodes 532 and a plurality of shielding electrodes 580. The shielding electrodes 580 are located on the non-display area 110b of the substrate 110 and between the connection electrodes 520. According to the present embodiment, a controller connected to the touch-sensing display panel 500 may connect a ground signal to at least one of the shielding electrodes 580. Thereby, the shielding electrodes 580 can reduce crosstalk between the display signal and the sensing signal, and thus the display and touch-sensing quality of the touch-sensing display panel 500 provided herein can be improved.

Figure 6A:
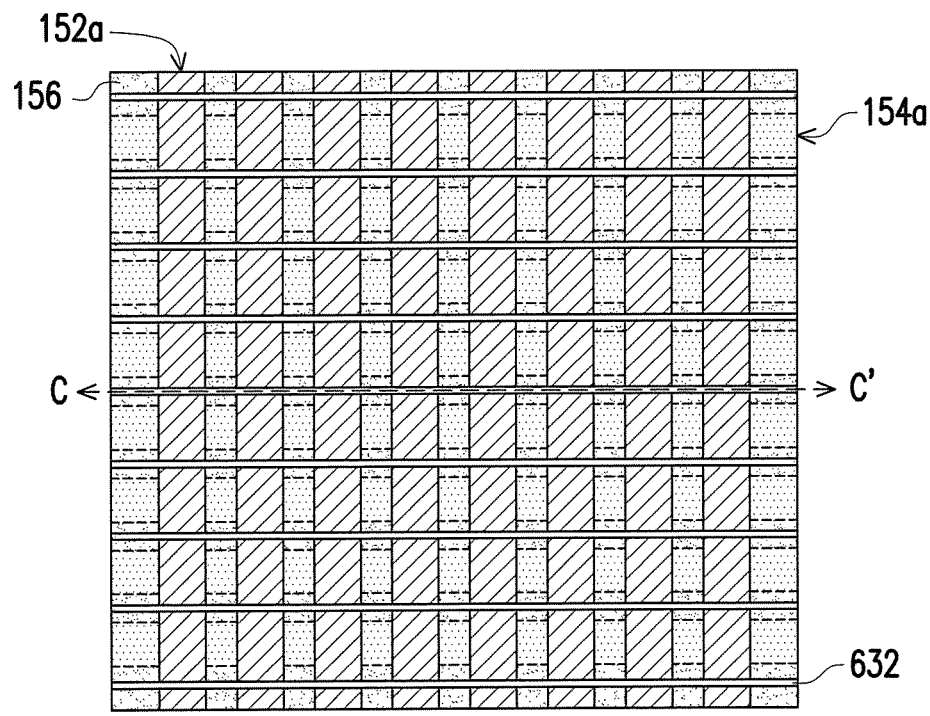
FIG. 6A is a schematic bottom view of a touch-sensing display panel according to a sixth embodiment of the disclosure.
Figure 6B:
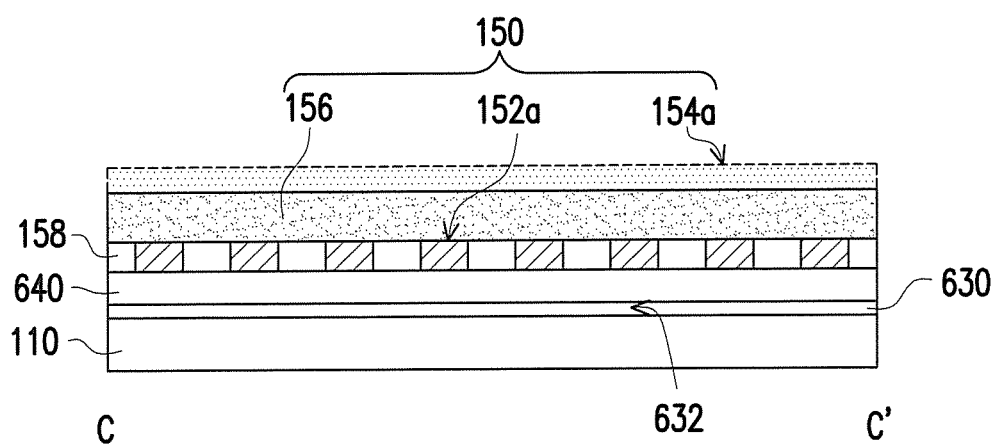
FIG. 6B is a schematic cross-sectional view taken along a section line C-C' in FIG. 6A.

FIG. 6A is a schematic top view of a touch-sensing display panel according to a sixth embodiment of the disclosure, wherein some film layers are omitted in FIG. 6A for illustrative purposes. FIG. 6B is a schematic cross-sectional view taken along a section line C-C' in FIG. 6A. The touch-sensing display panel 600 provided in the sixth embodiment is similar to the touch-sensing display panel 100 provided in FIG. 1A. In the present embodiment, the same or similar reference numbers representing the same or similar components in the touch-sensing display panel 100 are also applied in the touch-sensing display panel 600. Note that the schematic bottom view in FIG. 6A merely shows the display area (corresponding to the display area 110a shown in FIG. 1A) of the touch-sensing display panel. In FIG. 6B, the second display electrodes 154a are not shown on the sectional line C-C'; however, the projection range of the second display electrodes 154a is illustrated in dotted lines according to the present embodiment, so as to show the relevant locations of the first display electrodes 152a, the display medium layer 156, and the second display electrodes 154a. According to the present embodiment, a buffer layer 640 is disposed on the sensor electrodes 632, and the sensor electrodes 632 and the display device 150 are located on opposite sides of the buffer layer 640. The buffer layer 640 allows the first display electrodes 152a to be electrically insulated from the sensor electrodes 632. The second display electrodes 154a and the sensor electrodes 632 located in the display area 110a (shown in FIG. 1A) have the same extension direction, for instance, and the sensor electrodes 632 and the second display electrodes 154a are not overlapped.

In the present embodiment, the first display electrodes 152a not only act as the display electrodes of the display device 150 but also serve as the sensor electrodes of the sensor device. That is, the first display electrodes 152a sequentially driven in an appropriate manner can respectively receive the display signal and the sensing signal at different time intervals. When the first display electrodes 152a receive the display signal at one time interval, the first display electrodes 152a and the second display electrodes 154a can drive the display medium layer 156 to display the required image; when the first display electrodes 152a receive the sensing signal at another time interval, the first display electrodes 152a and the sensor electrodes 632 in the touch-sensing device layer 630 may be configured to sense the electrical changes resulting from a touch action of a user (e.g., changes to capacitance, resistance, and so on). At this time, if the user touches the touch-sensing display panel 600, the electrical changes sensed by the first display electrodes 152a and the sensor electrodes 632 may be detected and identified by a controller connected to the touch-sensing device layer 130.

Figure 7A:
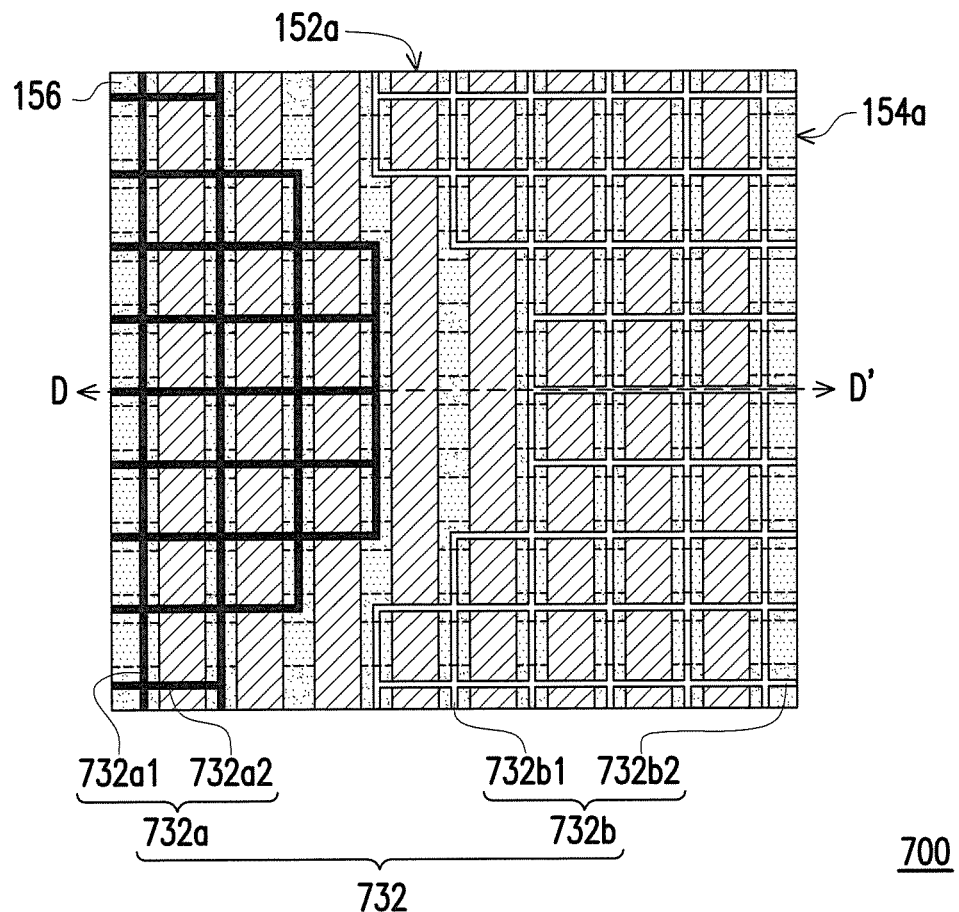
FIG. 7A is a schematic bottom view of a touch-sensing display panel according to a seventh embodiment of the disclosure.
Figure 7B:
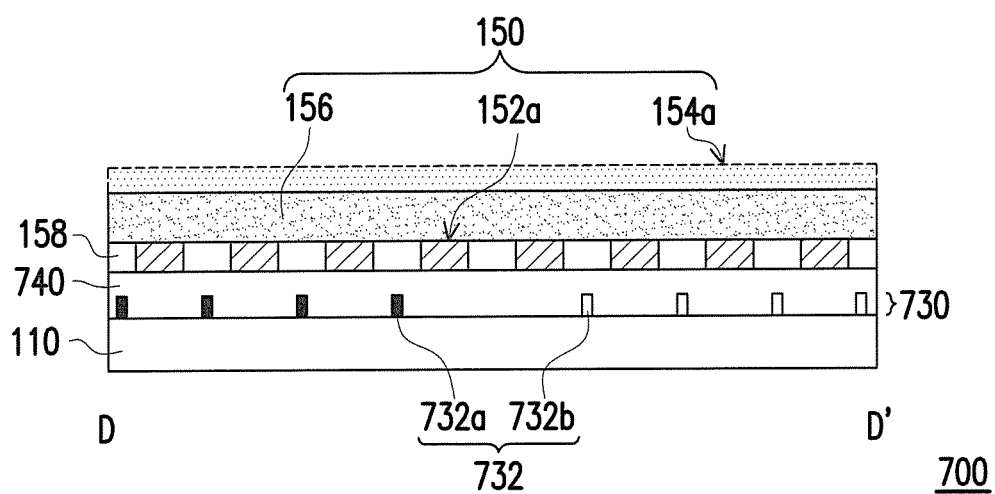
FIG. 7B is a schematic cross-sectional view taken along a section line D-D' in FIG. 7A.

FIG. 7A is a schematic bottom view of a touch-sensing display panel according to a seventh embodiment of the disclosure, wherein some film layers are omitted in FIG. 7A for illustrative purposes. The bottom view in FIG. 7A merely illustrates the display area (corresponding to the display area 110a depicted in FIG. 1A) of the touch-sensing display panel. FIG. 7B is a schematic cross-sectional view taken along a section line D-D' in FIG. 7A. The touch-sensing display panel 700 provided in the seventh embodiment is similar to the touch-sensing display panel 100 depicted in FIG. 1A. In the present embodiment, the touch-sensing device layer 730 includes a plurality of electrically insulated sensor electrodes 732, and the sensor electrodes 732 include a plurality of first sensor electrodes 732a and a plurality of second sensor electrodes 732b. The sensor electrodes 732 are located on the buffer layer 740, and the sensor electrodes 732 and the display device 150 are respectively located on opposite sides of the buffer layer 740. The buffer layer 740 allows the first display electrodes 152a, the first sensor electrodes 732a, and the second sensor electrodes 732b to be electrically insulated from one another.

According to the present embodiment, the second sensor electrodes 732b and the first sensor electrodes 732a located in the display area 110a (as shown in FIG. 1A) are meshed electrodes, for instance. The first sensor electrodes 732a have first portions 732a1 (e.g., vertical portions) whose extension directions are the same as the extension directions of the first display electrodes 152a and second portions 732a2 (e.g., horizontal portions) whose extension directions are the same as the extension directions of the second display electrodes 154a. The first portions 732a1 (i.e., the vertical portions) and the first display electrodes 152a are not overlapped, and the second portions 732a2 (i.e., the horizontal portions) and the second display electrodes 154a are not overlapped. The second sensor electrodes 732b have third portions 732b1 (e.g., vertical portions) whose extension directions are the same as the extension directions of the first display electrodes 152a and fourth portions 732b2 (e.g., horizontal portions) whose extension directions are the same as the extension directions of the second display electrodes 154a. The third portions 732b1 (i.e., the vertical portions) and the first display electrodes 152a are not overlapped, and the fourth portions 732b2 (i.e., the horizontal portions) and the second display electrodes 154a are not overlapped. As shown in FIG. 7A and FIG. 7B, the first sensor electrodes 732a and the second sensor electrodes 732b are adapted to sense the electrical changes resulting from a touch action of a user.

Figure 8A:
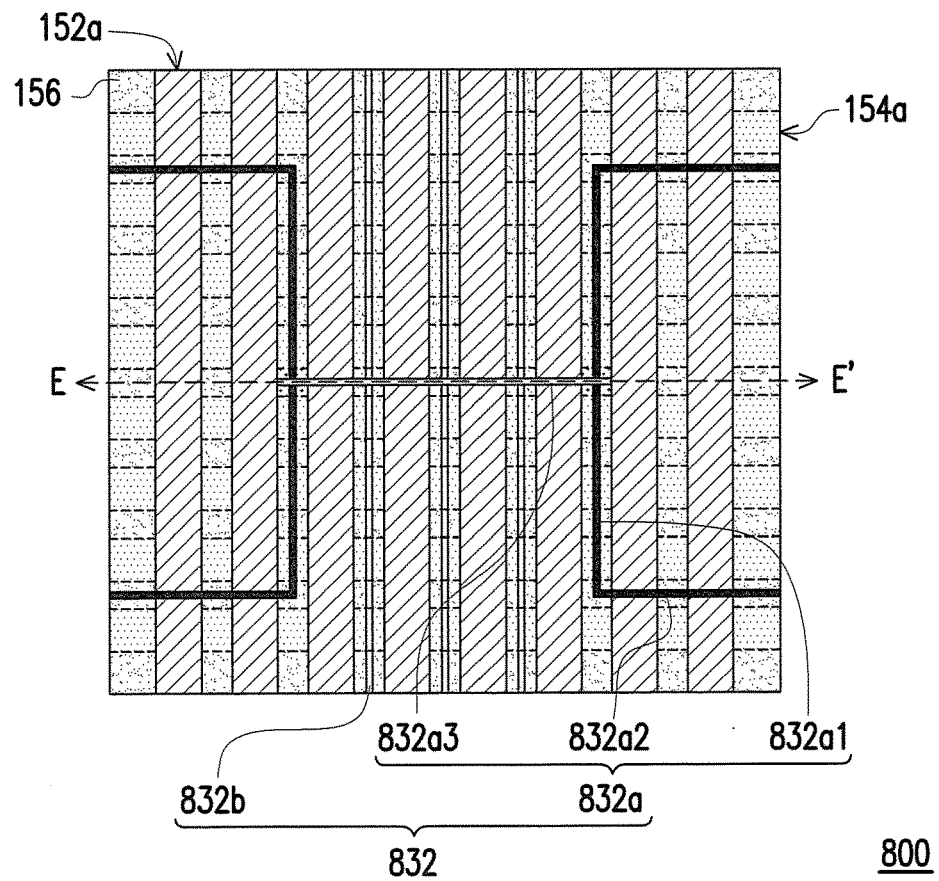
FIG. 8A is a schematic bottom view of a touch-sensing display panel according to an eighth embodiment of the disclosure.
Figure 8B:
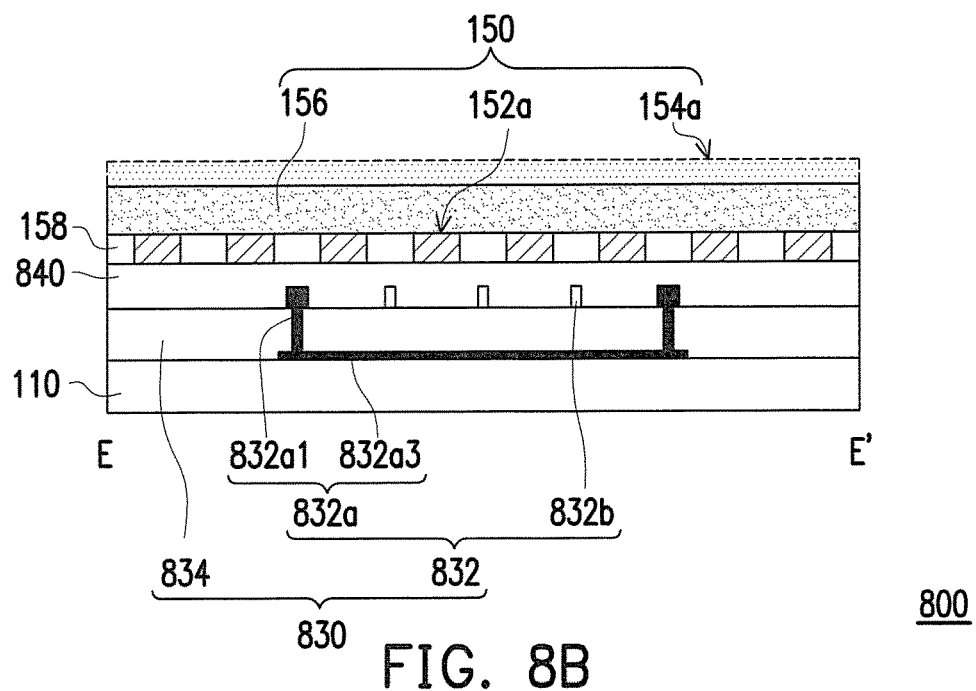
FIG. 8B is a schematic cross-sectional view taken along a section line E-E' in FIG. 8A.

FIG. 8A is a schematic top view of a touch-sensing display panel according to an eighth embodiment of the disclosure, wherein some film layers are omitted in FIG. 8A for illustrative purposes. FIG. 8B is a schematic cross-sectional view taken along a section line E-E' in FIG. 8A. Note that the schematic bottom view in FIG. 8A merely shows the display area (corresponding to the display area 110a shown in FIG. 1A) of the touch-sensing display panel. In FIG. 8B, the second display electrodes 154a are not shown on the sectional line E-E; however, the projection range of the second display electrodes 154a is illustrated in dotted lines according to the present embodiment, so as to show the relevant locations of the first display electrodes 152a, the display medium layer 156, and the second display electrodes 154a. The touch-sensing display panel 800 provided in the eighth embodiment is similar to the touch-sensing display panel 100 depicted in FIG. 1A. In the present embodiment, the touch-sensing device layer 830 includes a plurality of electrically insulated sensor electrodes 832, and the sensor electrodes 832 include a plurality of first sensor electrodes 832a and a plurality of second sensor electrodes 832b. The sensor electrodes 832 are located on the buffer layer 840, and the sensor electrodes 832 and the display device 150 are respectively located on opposite sides of the buffer layer 840. The buffer layer 840 allows the first display electrodes 152a, the first sensor electrodes 832a, and the second sensor electrodes 832b to be electrically insulated from one another.

The touch-sensing device layer 830 provided in the present embodiment may further have an insulation layer 834 where the first sensor electrodes 832a and the second sensor electrodes 832b are arranged. The second sensor electrodes 832b are located between the insulation layer 834 and the buffer layer 840, and the first sensor electrodes 832a located in the display area 110a (as shown in FIG. 1A) are meshed electrodes, for instance. The first sensor electrodes 832a have first portions 832a1 (e.g., vertical portions) whose extension directions are the same as the extension directions of the first display electrodes 152a and second portions 332a2 and third portions 832a3 (e.g., horizontal portions) whose extension directions are the same as the extension directions of the second display electrodes 154a. The first portions 832a1 and the first display electrodes 152a are not overlapped and are located on one side of the insulation layer 834 where the second sensor electrodes 832b are located. The second portions 832a2 and the second display electrodes 154a are not overlapped and are located on one side of the insulation layer 834 where the second sensor electrodes 832b are located. The third portions 832a3 and the second display electrodes 154a are not overlapped and are located on the other side of the insulation layer 834 opposite to the second sensor electrodes 832b. That is, the first portions 832a1, the second portions 832a2, and the second sensor electrodes 832b are located on the same side of the insulation layer 834. The third portions 832a3 and the second sensor electrodes 832b are located on two opposite sides of the insulation layer 834. In the area where the first portions 832a1 and the third portions 832a3 are overlapped, the first portions 832a1 penetrate the insulation layer 834, so as to be electrically connected to the third portion 832a3 located on the opposite side of the insulation layer 834. As shown in FIG. 8A and FIG. 8B, the first sensor electrodes 832a and the second sensor electrodes 832b are adapted to sense the electrical changes resulting from a touch action of a user.

Figure 9A:
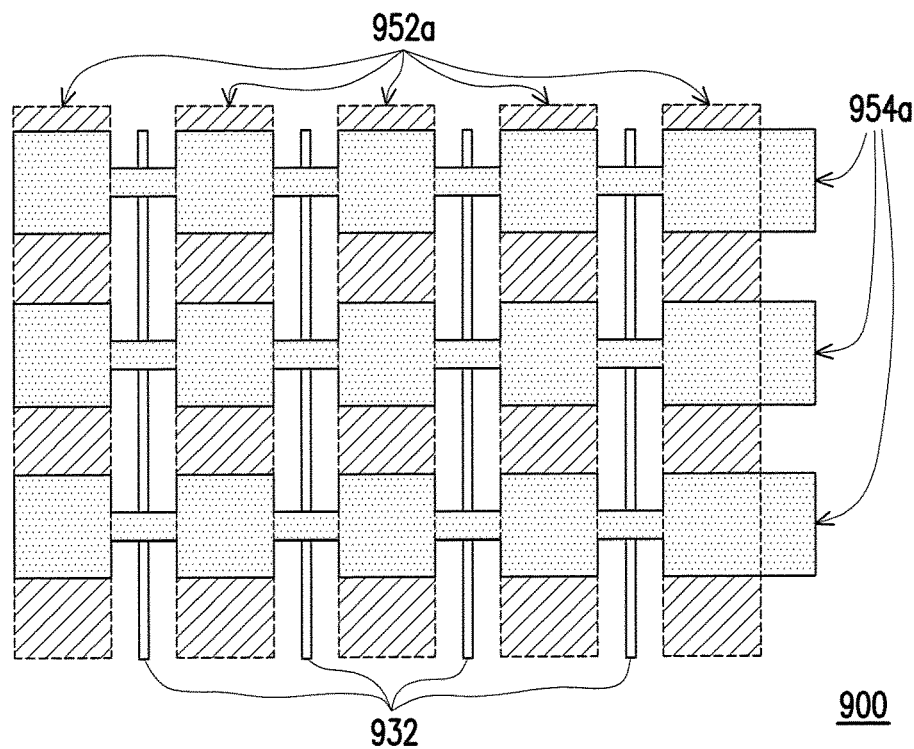
FIG. 9A is a schematic top view of a touch-sensing display panel according to a ninth embodiment of the disclosure.

FIG. 9A is a schematic top view of a touch-sensing display panel according to a ninth embodiment of the disclosure, wherein some film layers are omitted in FIG. 9A for illustrative purposes. The touch-sensing display panel 900 provided in the ninth embodiment is similar to the touch-sensing display panel 100 depicted in FIG. 1A. In the present embodiment, the second display electrodes 954a located in the display area 110a (as shown in FIG. 1A) and the first display electrodes 952a are overlapped, and the second display electrodes 954a include a plurality of necking portions that are not overlapped with the first display electrodes 952a. As shown in FIG. 9A, the necking portions of the second display electrodes 954a and the sensor electrodes 932 are staggered and overlapped. Since the width of the necking portions of the second display electrodes 954a is less than the width of other portions of the second display electrodes 954a, the overlapping area of the necking portions and the sensor electrodes 932 is not overly large. That is, the overlapping area of the necking portions and the sensor electrodes 932 can be minimized to reduce crosstalk between the display signal and the sensing signal, and thus the display and touch-sensing quality of the touch-sensing display panel 900 provided herein can be improved.

Figure 9B:
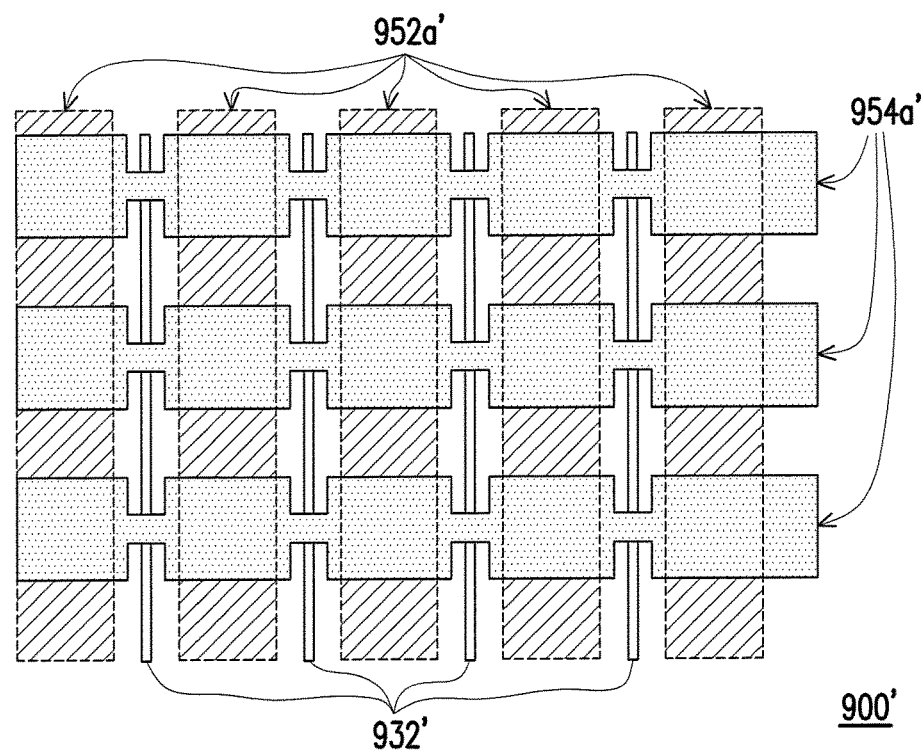
FIG. 9B is a schematic top view of a touch-sensing display panel according to a tenth embodiment of the disclosure.

FIG. 9B is a schematic top view of a touch-sensing display panel according to a tenth embodiment of the disclosure, wherein some film layers are omitted in FIG. 9B for illustrative purposes. The touch-sensing display panel 900' provided in the tenth embodiment is similar to the touch-sensing display panel 900 provided in FIG. 9A. In the present embodiment, the length of the necking portions of the second display electrodes 954a' is less than the distance between two adjacent first display electrodes 952a'. Similarly, the overlapping area of the second display electrodes 954a' and the sensor electrodes 932' can be minimized to reduce crosstalk between the display signal and the sensing signal, and thus the display and touch-sensing quality of the touch-sensing display panel 900' provided herein can be improved.

Figure 10A:
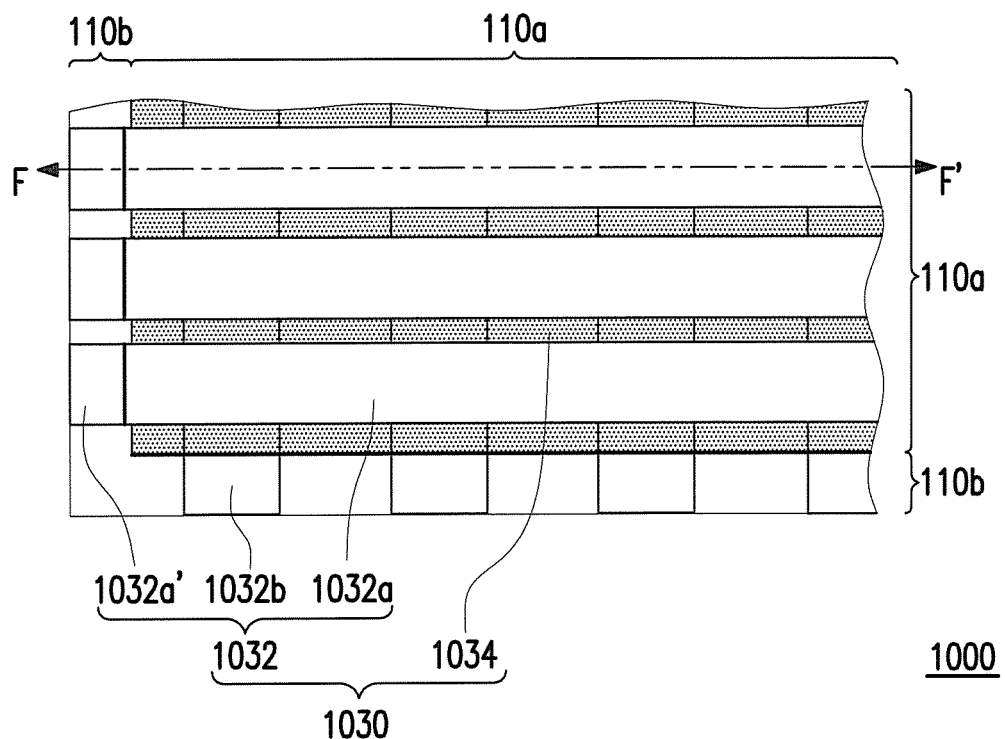
FIG. 10A is a schematic top view of a touch-sensing display panel according to an eleventh embodiment of the disclosure.
Figure 10B:
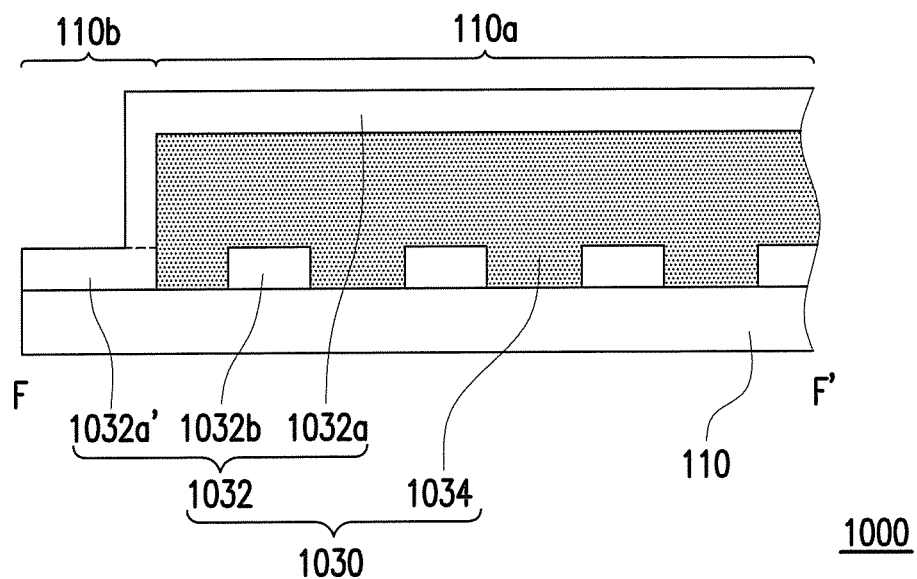
FIG. 10B is a schematic cross-sectional view taken along a section line F-F' in FIG. 10A.

FIG. 10A is a schematic top view of a touch-sensing display panel according to an eleventh embodiment of the disclosure, wherein some film layers are omitted in FIG. 10A for illustrative purposes. The top view in FIG. 10A merely illustrates the location where the display area 110a and the non-display area 110b of the touch-sensing display panel are connected. FIG. 10B is a schematic cross-sectional view taken along a section line F-F' in FIG. 10A. The touch-sensing display panel 1000 provided in the tenth embodiment is similar to the touch-sensing display panel 100 provided in FIG. 1A. In the present embodiment, the touch-sensing device layer 1030 includes a plurality of electrically insulated sensor electrodes 1032, and the sensor electrodes 1032 may have the double-layered electrode structure. Specifically, the sensor electrodes 1032 located in the display area 110a include a plurality of first sensor electrodes 1032a and a plurality of second sensor electrodes 1032b, and the second sensor electrodes 1032b in the display area 110a are located between the first sensor electrodes 1032a and the substrate 110. The insulation layer 1034 is located between adjacent first sensor electrodes 1032a, between adjacent second sensor electrodes 1032b, and between the first sensor electrodes 1032a and the second sensor electrodes 1032b, such that the adjacent first sensor electrodes 1032a, the adjacent second sensor electrodes 1032b, and the first sensor electrodes 1032a and the second sensor electrodes 1032b are electrically insulated.

In the present embodiment, the sensor electrodes 1032 further extend to the non-display area 110b. The sensor electrodes 1032 located in the non-display area 110b further include a plurality of first sensor electrodes 1032a', and the first sensor electrodes 1032a' and the second sensor electrodes 1032b are located on the substrate 110. The first sensor electrodes 1032a' in the non-display area 110b may cover a portion of the insulation layer 1034 in the display area 110a and may be electrically connected to the corresponding first sensor electrodes 1032a in the non-display area 110b. As shown in FIG. 10A and FIG. 10B, the first sensor electrodes 1032a and the second sensor electrodes 1032b are adapted to sense the electrical changes resulting from a touch action of a user. If the user touches the touch-sensing display panel 1000, the electrical changes sensed by the first sensor electrodes 1032a and the second sensor electrodes 1032b may be detected and identified by a controller connected to the touch-sensing device layer 1030.

Figure 11A:
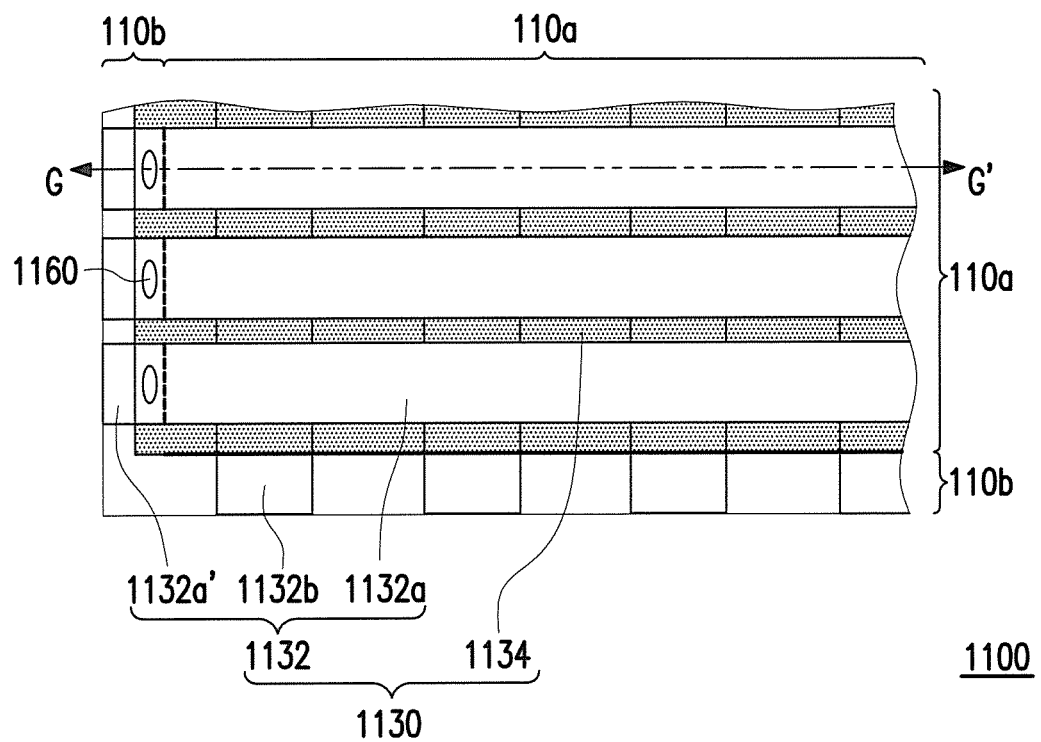
FIG. 11A is a schematic top view of a touch-sensing display panel according to a twelfth embodiment of the disclosure.
Figure 11B:
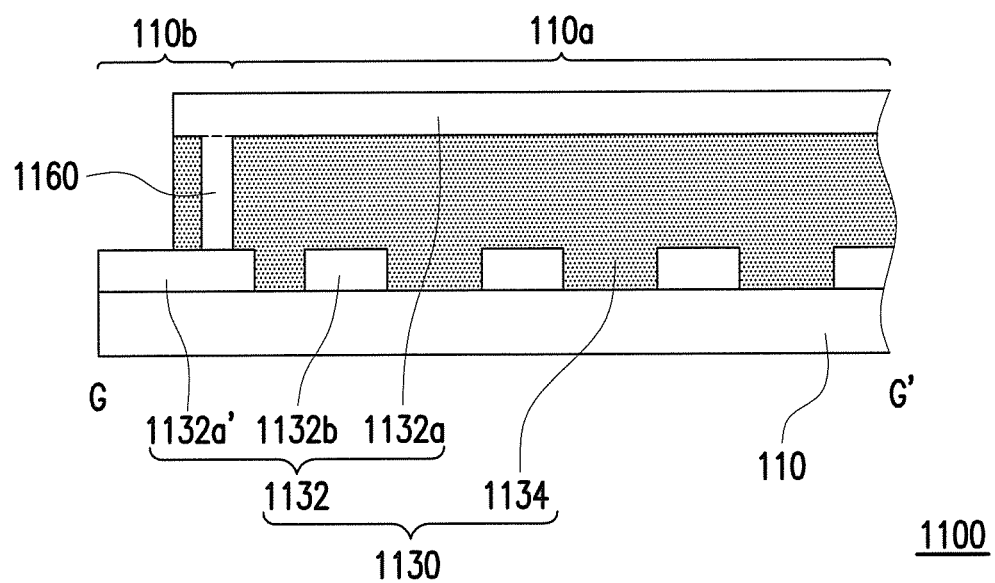
FIG. 11B is a schematic cross-sectional view taken along a section line G-G' in FIG. 11A.

FIG. 11A is a schematic top view of a touch-sensing display panel according to a twelfth embodiment of the disclosure, wherein some film layers are omitted in FIG. 11A for illustrative purposes. The top view in FIG. 11A merely illustrates the location where the display area 110a and the non-display area 110b of the touch-sensing display panel are connected. FIG. 11B is a schematic cross-sectional view taken along a section line G-G' in FIG. 11A. The touch-sensing display panel 1100 provided in the twelfth embodiment is similar to the touch-sensing display panel 1000 provided in FIG. 10A. In the present embodiment, the insulation layer 1134 may extend to the non-display area 110b, and the sensor electrodes 1132 can also extend to the non-display area 110b. The sensor electrodes 1132 located in the non-display area 110b include a plurality of first sensor electrodes 1132a', and the first sensor electrodes 1132a' and the second sensor electrodes 1132b are located on the substrate 110. The insulation layer 1134 in the non-display area 110b has the conductive vias 1160. The first sensor electrodes 1132a' in the non-display area 110b are electrically connected to one of the first sensor electrodes 1032a in the display area 110a through the corresponding conductive via 1160. As shown in FIG. 11A and FIG. 11B, the first sensor electrodes 1132a and the second sensor electrodes 1132b are adapted to sense the electrical changes resulting from a touch action of a user. If the user touches the touch-sensing display panel 1100, the electrical changes sensed by the first sensor electrodes 1132a and the second sensor electrodes 1132b may be detected and identified by a controller connected to the touch-sensing device layer 1130.

Figure 12A:
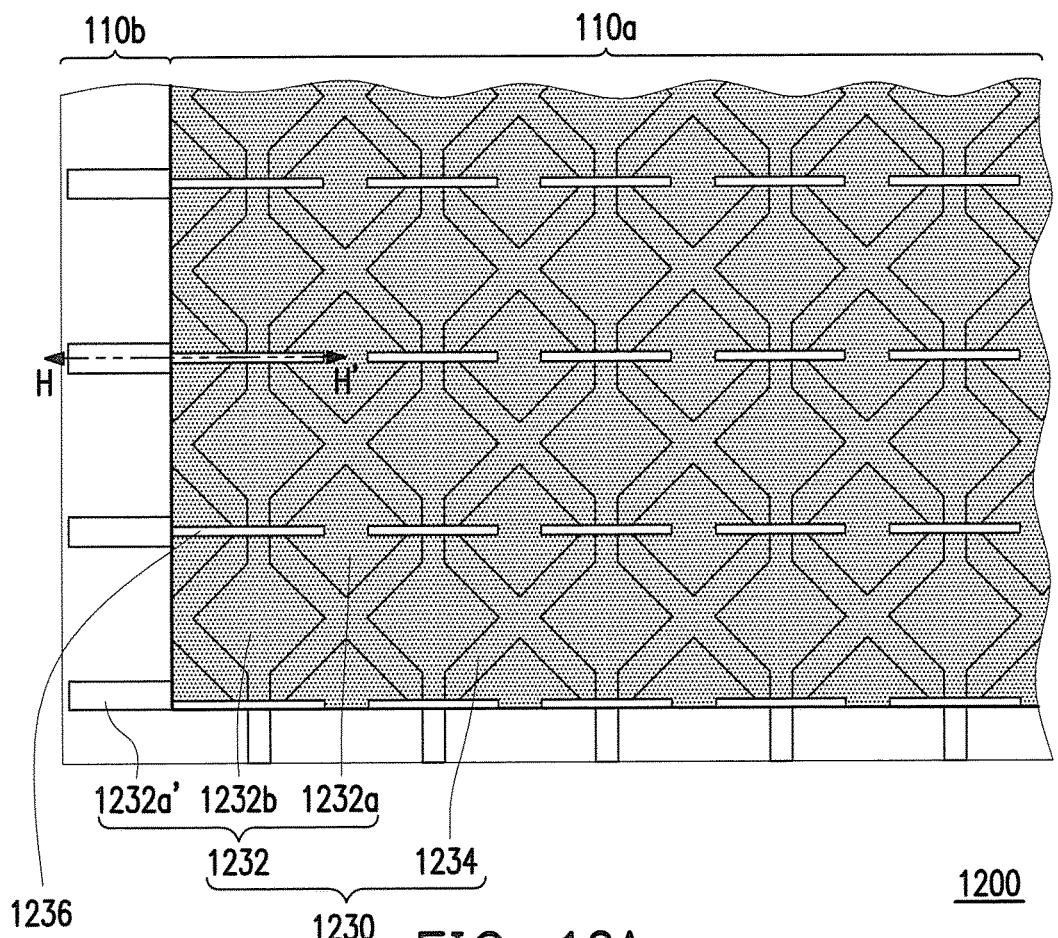
FIG. 12A is a schematic top view of a touch-sensing display panel according to a thirteenth embodiment of the disclosure.
Figure 12B:
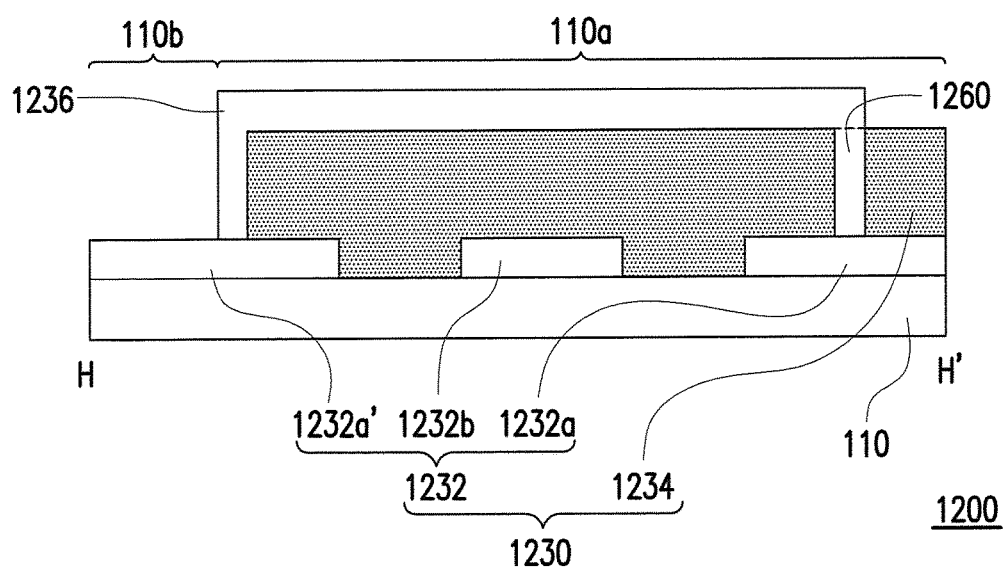
FIG. 12B is a schematic cross-sectional view taken along a section line H-H' in FIG. 12A.

FIG. 12A is a schematic top view of a touch-sensing display panel according to a thirteenth embodiment of the disclosure, wherein some film layers are omitted in FIG. 12A for illustrative purposes. The top view in FIG. 12A merely illustrates the location where the display area 110a and the non-display area 110b of the touch-sensing display panel are connected. FIG. 12B is a schematic cross-sectional view taken along a section line H-H' in FIG. 12A. The touch-sensing display panel 1200 provided in the thirteenth embodiment is similar to the touch-sensing display panel 100 provided in FIG. 1A. In the present embodiment, the touch-sensing device layer 1230 includes a plurality of electrically insulated sensor electrodes 1232, and the sensor electrodes 1232 may have the single-layered electrode structure or the bridged electrode structure. Specifically, the sensor electrodes 1232 located in the display area 110a include a plurality of first sensor electrodes 1232a and a plurality of second sensor electrodes 1232b, and the first sensor electrodes 1232a and the second sensor electrodes 1232b are located on the substrate 110. The insulation layer 1234 is located between adjacent first sensor electrodes 1232a, between adjacent second sensor electrodes 1232b, and between the first sensor electrodes 1232a and the second sensor electrodes 1232b, such that the adjacent first sensor electrodes 1232a, the adjacent second sensor electrodes 1232b, and the first sensor electrodes 1232a and the second sensor electrodes 1232b are electrically insulated. To be specific, the touch-sensing device layer 1230 in the display area 110a has a touch-sensing bridge 1236. The insulation layer 1234 is located between the touch-sensing bridge 1236 and the second sensor electrodes 1232b, such that the touch-sensing bridge 1236 and the second sensor electrodes

1232*b* are electrically insulated. The insulation layer 1234 in the display area 110*a* has the conductive vias 1260. Each of the first sensor electrode 1232*a* in the display area 110*a* is electrically connected to the corresponding touch-sensing bridge 1236 through the corresponding conductive via 1260.

In the present embodiment, the sensor electrodes 1232 may extend to the non-display area 110*b*, and the sensor electrodes 1232 in the non-display area 110*b* further include a plurality of first sensor electrodes 1232*a*'. The first sensor electrodes 1232*a*' and the second sensor electrodes 1232*b* are located on the substrate 110. Specifically, the first sensor electrodes 1232*a*' in the non-display area 110*b* covers a portion of the insulation layer 1234 in the display area 110*a* and is electrically connected to the corresponding touch-sensing bridge 1236 in the non-display area 110*b*. As shown in FIG. 12A and FIG. 12B, the first sensor electrodes 1232*a* and the second sensor electrodes 1232*b* are adapted to sense the electrical changes resulting from a touch action of a user. If the user touches the touch-sensing display panel 1200, the electrical changes sensed by the first sensor electrodes 1232*a* and the second sensor electrodes 1232*b* may be detected and identified by a controller connected to the touch-sensing device layer 1130.

Figure 13A:
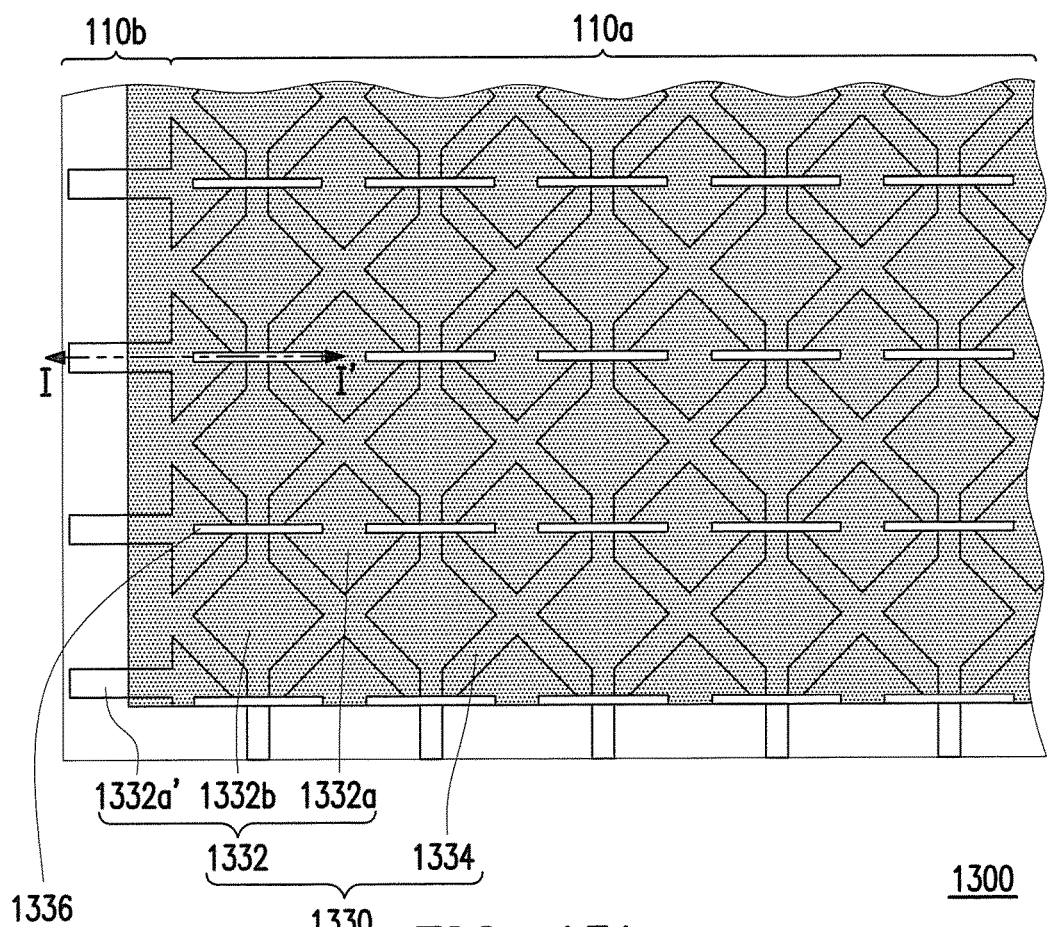
FIG. 13A is a schematic top view of a touch-sensing display panel according to a fourteenth embodiment of the disclosure.
Figure 13B:
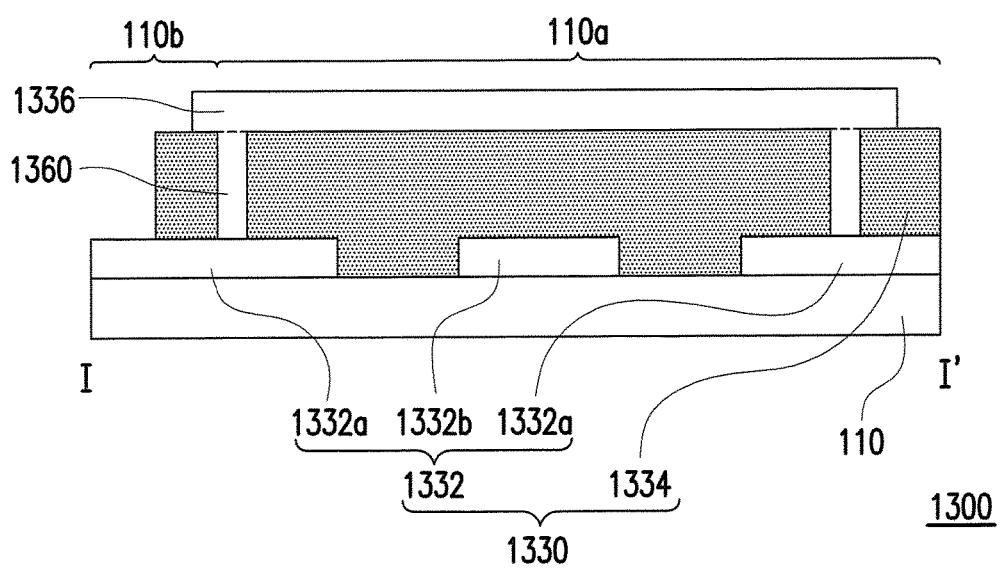
FIG. 13B is a schematic cross-sectional view taken along a section line I-I' in FIG. 13A.

FIG. 13A is a schematic top view of a touch-sensing display panel according to a fourteenth embodiment of the disclosure, wherein some film layers are omitted in FIG. 13A for illustrative purposes. The top view in FIG. 13A merely illustrates the location where the display area 110*a* and the non-display area 110*b* of the touch-sensing display panel are connected. FIG. 13B is a schematic cross-sectional view taken along a section line I-I' in FIG. 13A. The touch-sensing display panel 1300 provided in the fourteenth embodiment is similar to the touch-sensing display panel 1200 provided in FIG. 12A. In the present embodiment, the insulation layer 1334 may extend to the non-display area 110*b*, and the sensor electrodes 1332 can also extend to the non-display area 110*b*. The sensor electrodes 1332 located in the non-display area 110*b* include a plurality of first sensor electrodes 1332*a*, and the first sensor electrodes 1332*a* and the second sensor electrodes 1332*b* are located on the substrate 110. The insulation layer 1334 has the conductive vias 1360. Each of the first sensor electrodes 1332*a* in the non-display area 110*b* is electrically connected to one of the touch-sensing bridges 1336 on the display area 110*a* through the corresponding conductive via 1360. As shown in FIG. 13A and FIG. 13B, the first sensor electrodes 1332*a* and the second sensor electrodes 1332*b* are adapted to sense electrical changes resulting from a touch action of a user. If the user touches the touch-sensing display panel 1300, the electrical changes sensed by the first sensor electrodes 1332*a* and the second sensor electrodes 1332*b* may be detected and identified by a controller connected to the touch-sensing device layer 1330.

Figure 14A:
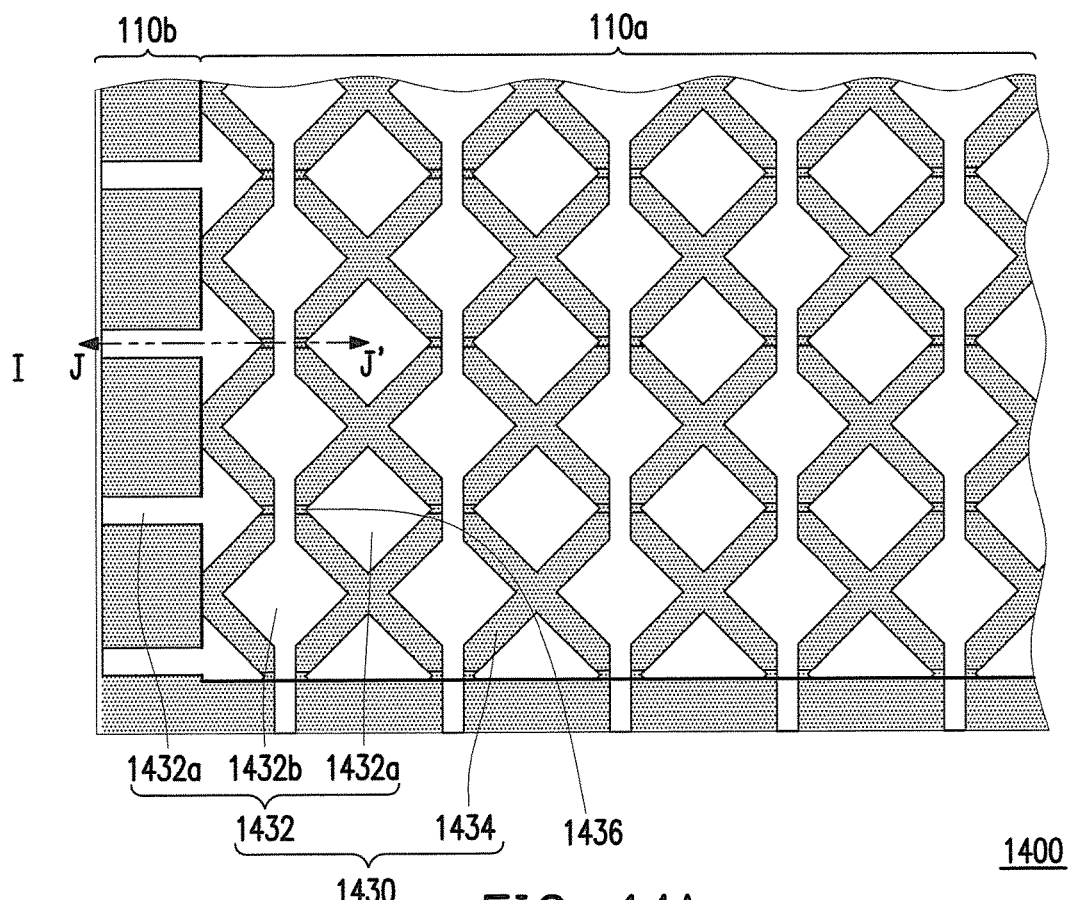
FIG. 14A is a schematic top view of a touch-sensing display panel according to a fifteenth embodiment of the disclosure.
Figure 14B:
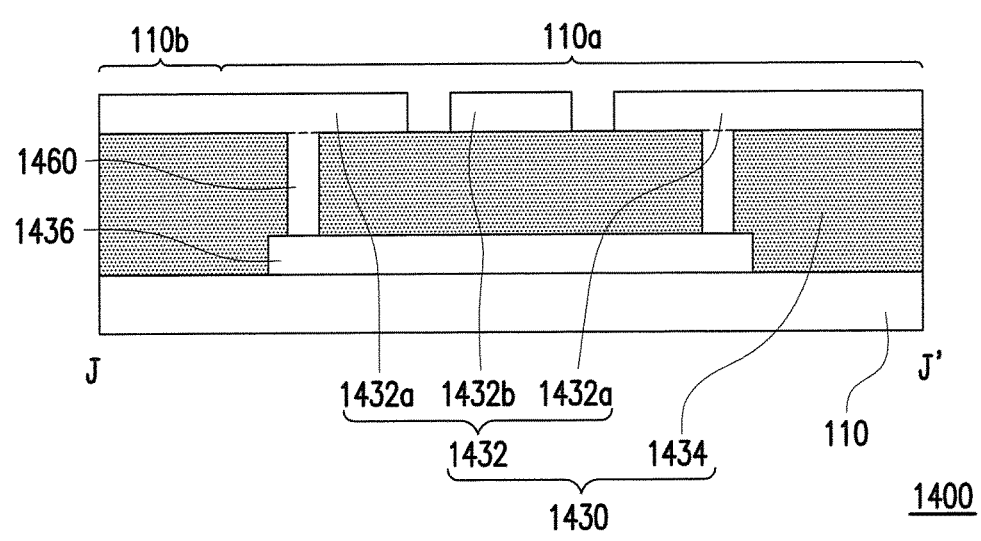
FIG. 14B is a schematic cross-sectional view taken along a section line J-J' in FIG. 14A.

FIG. 14A is a schematic top view of a touch-sensing display panel according to a fifteenth embodiment of the disclosure, wherein solve film layers are omitted in FIG. 14A for illustrative purposes. The top view in FIG. 14A merely illustrates the location where the display area 110*a* and the non-display area 110*b* of the touch-sensing display panel are connected. FIG. 14B is a schematic cross-sectional view taken along a section line J-J' in FIG. 14A. The touch-sensing display panel 1400 provided in the fifteenth embodiment is similar to the touch-sensing display panel 1300 provided in FIG. 13A. In the present embodiment, the insulation layer 1434 may extend to the non-display area 110*b*, and the sensor electrodes 1432 can also extend to the non-display area 110*b*. The sensor electrodes 1432 located in the non-display area 110*b* include a plurality of first sensor electrodes 1432*a*, and the first sensor electrodes 1432*a* and the second sensor electrodes 1432*b* are located on the insulation layer 1434. The insulation layer 1434 has the conductive vias 1460. Each of the first sensor electrodes 1432*a* in the non-display area 110*b* is electrically connected to one of the touch-sensing bridges 1436 on the display area 110*a* through the corresponding conductive via 1460. As shown in FIG. 14A and FIG. 14B, the first sensor electrodes 1432*a* and the second sensor electrodes 1432*b* are adapted to sense electrical changes resulting from a touch action of a user. If the user touches the touch-sensing display panel 1400, the electrical changes sensed by the first sensor electrodes 1432*a* and the second sensor electrodes 1432*b* may be detected and identified by a controller connected to the touch-sensing device layer 1430.

Figure 15:
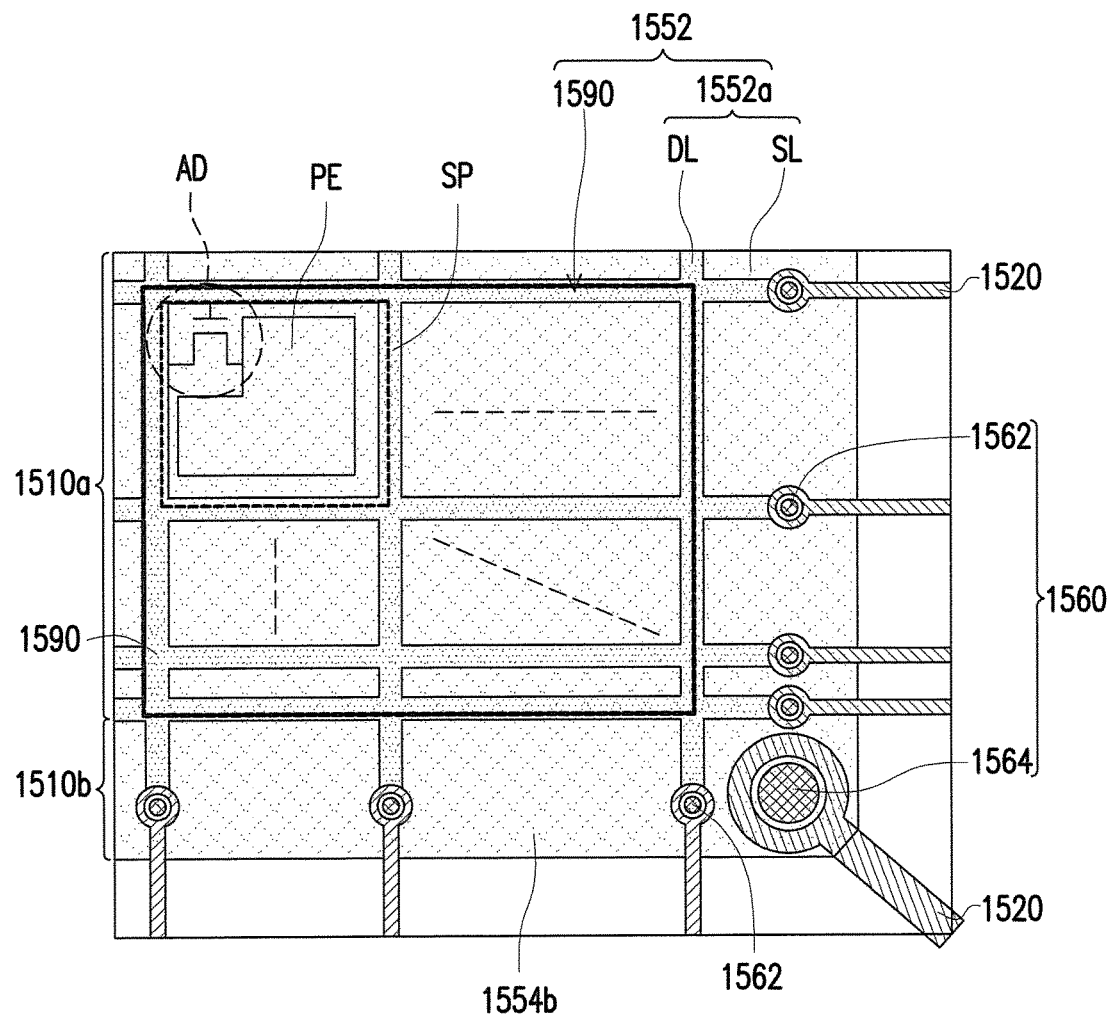
FIG. 15 is a schematic top view of a touch-sensing display panel according to a sixteenth embodiment of the disclosure.

FIG. 15 is a schematic top view of a touch-sensing display panel according to a sixteenth embodiment of the disclosure, wherein some film layers are omitted in FIG. 15 for illustrative purposes. The touch-sensing display panel 1500 provided in the sixteenth embodiment is similar to the touch-sensing display panel 100 provided in FIG. 1A. In the present embodiment, the first electrode layer 1552 includes a pixel array 1590, the second electrode layer (not shown) includes a common electrode 1554*b*. The pixel array 1590, the display medium layer (not shown), and the common electrode 1554*b* are stacked on the buffer layer (not shown), and the pixel array 1590 and the common electrode 1554*b* extend from the display area 1510*a* to the non-display area 1510*b*.

According to the present embodiment, scan lines SL and data lines DL are alternately arranged to define where each sub-pixel SP is located. FIG. 15 merely schematically illustrates some of the scan lines SL and some of the data lines DL. The sub-pixels SP are arranged in an array to form the pixel array 1590. In a scan line driver circuit (not shown), plural scan lines SL are coupled to the pixel array 1590, so as to drive the pixel array 1590; in a data line driver circuit (not shown), plural data lines DL are coupled to the pixel array 1590, so as to drive the pixel array 1590. Each sub-pixel SP includes an active device AD and a pixel electrode PE. Each of the active devices AD is electrically connected to the corresponding scan line SL and the corresponding data line DL, and each sub-pixel SP is driven by electrical signals sent through the corresponding one of the scan lines SL and the corresponding one of the data lines DL.

The active devices AD provided herein are, for example, thin film transistors (TFTs) or other switching devices with three terminals. In an exemplary TFT, a gate of the TFT is electrically connected to the corresponding scan line SL, a source of the TFT is electrically connected to the corresponding data line DL, and a drain of the TFT is electrically connected to the pixel electrode PE. According to an exemplary embodiment, each sub-pixel SP and the common electrode 1554*b* may be configured to drive the display medium layer (not shown). For instance, the common electrode 1554*b* may be grounded or electrically connected to a common voltage VSS.

An embodiment of the disclosure provides the touch-sensing display panel that can effectively integrate the circuit layout of the touch-sensing device layer and the display device in the peripheral area of the touch-sensing display panel. An embodiment of the disclosure provides the touch-sensing display panel that can integrate the touch-sensing device layer and the display device on the same substrate, so as to reduce the thickness of the touch-sensing display panel. What is more, the touch-sensing display panel provided in some embodiments of the disclosure is equipped with the shielding electrodes that can reduce crosstalk between the display signal and the sensing signal, and thus the display and touch-sensing quality of the touch-sensing display panel provided herein can be improved.

It will be clear that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch-sensing display panel comprising:
    a substrate having a display area and a non-display area connecting the display area;
    a plurality of connection electrodes located within the non-display area of the substrate;
    a touch-sensing device layer located within the display area of the substrate;
    a buffer layer covering the touch-sensing device layer
    a display device disposed on the buffer layer and corresponding to the display area, the display device comprising a first electrode layer, a second electrode layer, and a display medium layer located between the first electrode layer and the second electrode layer, wherein the first electrode layer and the second electrode layer respectively include a first filler area and a second filler area and extend from the display area to the non-display area; and
    a plurality of conductive vias penetrating the buffer layer and the touch-sensing device layer, and located within the non-display area, wherein the first electrode layer and the second electrode layer are electrically connected to the connection electrodes through the conductive vias.

2. The touch-sensing display panel according to claim 1, wherein the touch-sensing device layer further extends to the non-display area.

3. The touch-sensing display panel according to claim 1, wherein the first electrode layer comprises a plurality of first display electrodes, the second electrode layer comprises a plurality of second display electrodes, the first display electrodes, the display medium layer, and the second display electrodes are stacked on the buffer layer, and the first display electrodes and the second display electrodes extend from the display area to the non-display area.

4. The touch-sensing display panel according to claim 3, wherein the first filler area is located among the first display electrodes, the first display electrodes are insulated from one another.

5. The touch-sensing display panel according to claim 3, wherein the second filler area is located among the second display electrodes, the second display electrodes are insulated from one another.

6. The touch-sensing display panel according to claim 3, wherein the conductive vias comprise a plurality of first conductive vias and a plurality of second conductive vias, the first conductive vias are connected between the first display electrodes and some of the connection electrodes, and the second conductive vias are connected between the second display electrodes and the other connection electrodes.

7. The touch-sensing display panel according to claim 6, wherein the first conductive vias penetrate the buffer layer and the touch-sensing device layer, and the second conductive vias penetrate the buffer layer, the touch-sensing device layer, and the display medium layer.

8. The touch-sensing display panel according to claim 6, wherein the first conductive vias penetrate the buffer layer and the touch-sensing device layer, and the second conductive vias penetrate the buffer layer, the touch-sensing device layer, and a portion of the display device.

9. The touch-sensing display panel according to claim 8, wherein the second electrode layer extend to some of the second conductive vias not covered by the display medium layer, and the second electrode layer is electrically connected to some of the connection electrodes through the second conductive vias.

10. The touch-sensing display panel according to claim 1, further comprising a barrier layer disposed between the second electrode layer and the substrate, on an outer surface of the substrate, or on the second electrode layer.

11. The touch-sensing display panel according to claim 1, wherein the second electrode layer extend to a portion of the buffer layer not covered by the touch-sensing device layer, and the second electrode layer is electrically connected to some of the connection electrodes through some of the conductive vias.

12. The touch-sensing display panel according to claim 1, wherein the touch-sensing device layer comprises a plurality of sensor electrodes electrically insulated from one another.

13. The touch-sensing display panel according to claim 12, further comprising a plurality of shielding electrodes, the shielding electrodes being located within the non-display area of the substrate and disposed among the connection electrodes.

14. The touch-sensing display panel according to claim 12, wherein the sensor electrodes are disposed on the buffer layer, the sensor electrodes and the display device are located on opposite sides of the buffer layer, and the sensor electrodes and the first electrode layer are respectively adapted for sensing electrical changes resulting from a touch action of a user.

15. The touch-sensing display panel according to claim 12, wherein the sensor electrodes comprise a plurality of first sensor electrodes and a plurality of second sensor electrodes, and the first sensor electrodes and the second sensor electrodes are located on the buffer layer and adapted for sensing electrical changes resulting from a touch action of a user.

16. The touch-sensing display panel according to claim 12, wherein the sensor electrodes comprise a plurality of first sensor electrodes, a plurality of second sensor electrodes, and an insulation layer between the first sensor electrodes and the second sensor electrodes, the first sensor electrodes, the insulation layer, and the second sensor electrodes are stacked on the buffer layer, and the first sensor electrodes and the second sensor electrodes are adapted for sensing electrical changes resulting from a touch action of a user.

17. The touch-sensing display panel according to claim 1, wherein the first electrode layer comprises a pixel array, the second electrode layer comprises a common electrode, the pixel array, the display medium layer, and the common electrode are stacked on the buffer layer, and the pixel array and the common electrode extend from the display area to the non-display area.

18. The touch-sensing display panel according to claim 17, wherein the conductive vias comprise a plurality of first conductive vias and at least one second conductive via, the first conductive vias are connected between the pixel array and some of the connection electrodes, and the second conductive via is connected between the common electrode and the other connection electrode.

\* \* \* \* \*